(12) United States Patent
Kunitomo

(10) Patent No.: US 11,322,115 B2
(45) Date of Patent: May 3, 2022

(54) DISPLAY SYSTEM, DISPLAY CONTROL METHOD, AND PROGRAM

(71) Applicant: SEIKO EPSON CORPORATION, Tokyo (JP)

(72) Inventor: Yuichi Kunitomo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/037,643

(22) Filed: Sep. 29, 2020

(65) Prior Publication Data

US 2021/0097959 A1 Apr. 1, 2021

(30) Foreign Application Priority Data

Sep. 30, 2019 (JP) .............................. JP2019-178692

(51) Int. Cl.
*G02B 27/01* (2006.01)
*G09G 5/10* (2006.01)
*G09G 3/3208* (2016.01)

(52) U.S. Cl.
CPC ........... *G09G 5/10* (2013.01); *G02B 27/0172* (2013.01); *G09G 3/3208* (2013.01); *G02B 2027/0178* (2013.01); *G09G 2360/141* (2013.01); *G09G 2360/145* (2013.01)

(58) Field of Classification Search
CPC .. G09G 5/10; G09G 3/3208; G09G 2360/141; G09G 2360/145; G02B 27/0172; G02B 2027/0178
See application file for complete search history.

(56) References Cited

U.S. PATENT DOCUMENTS

| 2015/0363979 | A1* | 12/2015 | Takano | ................... | A61B 6/462 |
|---|---|---|---|---|---|
| | | | | | 345/633 |
| 2017/0053575 | A1* | 2/2017 | Ishikawa | ................. | G09G 3/001 |
| 2017/0178565 | A1* | 6/2017 | Fujimaki | ................. | G09G 3/003 |
| 2018/0246563 | A1* | 8/2018 | Kunitomo | ................ | G06F 3/012 |
| 2018/0322845 | A1* | 11/2018 | Machida | ............... | G02B 26/026 |
| 2021/0012702 | A1* | 1/2021 | Liu | ........................... | G09G 3/22 |

FOREIGN PATENT DOCUMENTS

WO 2015125363 8/2015

* cited by examiner

*Primary Examiner* — Antonio Xavier
(74) *Attorney, Agent, or Firm* — JCIPRNET

(57) ABSTRACT

A display system, a display control method for the display system and a non-transitory computer readable recording medium storing a program executable by a computer coupled to the display device are provided. The display system includes an HMD and a smartphone. The HMD includes an image display unit that transmits outside light and displays an image, and a DP illuminance sensor that detects an illuminance of the outside light. The smartphone includes an SP display control unit that adjusts, based on first illuminance information indicating a detection result of the DP illuminance sensor, a brightness of the image displayed by the image display unit, and an SP illuminance sensor that detects the illuminance. The SP display control unit can adjust the brightness of the image, based on second illuminance information indicating a detection result of the SP illuminance sensor.

8 Claims, 10 Drawing Sheets

DISPLAY SYSTEM, DISPLAY CONTROL METHOD, AND PROGRAM

The present application is based on, and claims priority from JP Application Serial Number 2019-178692, filed Sep. 30, 2019, the disclosure of which is hereby incorporated by reference herein in its entirety.

BACKGROUND

1. Technical Field

The present disclosure relates to a display system, a display control method, and a program.

2. Related Art

In related art, technology is known in which a wearable optical device, such as a head-mounted display, includes an optical system that transmits light in real space, and displays an image superimposed on the real space (see, for example, WO 2015/125363). The apparatus described in WO 2015/125363 increases visibility of the image by using an illuminance sensor to detect the illuminance of light incident on an observer from the real space, and determining a brightness of the image display on the basis of the detected illuminance.

As described in WO 2015/125363, when the display is controlled based on the detection result of the illuminance sensor, the visibility of the display may deteriorate when accurate detection is not possible by the illuminance sensor. For example, in a state in which detection of illuminance is hindered, such as the illuminance sensor being in the shadow of other objects, there is a problem in that visibility of the display cannot be maintained.

SUMMARY

An aspect of the present disclosure is a display system including a display device, and a control device. The display device includes a display unit configured to transmit outside light and display an image, and a first illuminance detection unit configured to detect an illuminance of the outside light. The control device includes a display control unit configured to adjust, based on first illuminance information indicating a detection result of the first illuminance detection unit, a brightness of the image displayed by the display unit, and a second illuminance detection unit configured to detect the illuminance. The display control unit is configured to adjust the brightness of the image, based on second illuminance information indicating a detection result of the second illuminance detection unit.

In the display system described above, a configuration may be adopted in which the display control unit adjusts, based on the second illuminance information, the brightness of the image when the second illuminance detection unit is oriented in a direction corresponding to the outside light transmitting through the display unit.

In the display system described above, a configuration may be adopted in which the control device includes a motion sensor, and the display control unit adjusts, based on the second illuminance information, the brightness of the image when a direction of the second illuminance detection unit specified by the motion sensor is oriented in a direction corresponding to the outside light transmitting through the display unit.

In the display system described above, a configuration may be adopted in which the display device includes an image capture unit, the control unit includes an image processing unit configured to generate, based on a captured image of the image capture unit, third illuminance information relating to the illuminance of the outside light incident on the image capture unit, and the display control unit is configured to adjust the brightness of the image, based on the third illuminance information.

In the display system described above, a configuration may be adopted in which the image capture unit captures a range overlapping with an outside scene visible through the display unit.

In the display system described above, a configuration may be adopted in which the image processing unit generates the third illumination information, based on brightness information of a predetermined number of pixels configuring the captured image.

In the display system described above, a configuration may be adopted in which a light modulating member configured to adjust the outside light incident on the display unit is detachably mounted on the display device, and, when the light modulating member is mounted on the display device, the display control unit adjusts the brightness of the image based on the second illuminance information.

Another aspect of the present disclosure is a display control method for a display system including: a display device including a display unit that transmits outside light and that displays an image; and a control device. The display control method includes detecting an illuminance of the outside light by a first illuminance detection unit of the display device, adjusting a brightness of the image displayed by the display unit, based on first illuminance information indicating a detection result of the first illuminance detection unit, and, when a light modulating member adjusting the outside light incident on the display unit is mounted on the display device, detecting the illuminance by a second illuminance detection unit of the display device, and adjusting the brightness of the image based on second illuminance information indicating a detection result of the second illuminance detection unit.

Yet another aspect of the present disclosure is a program executable by a computer coupled to a display device including a display unit that transmits outside light and displays an image. The program causes the computer to execute detecting an illuminance of the outside light by a first illuminance detection unit of the display device, adjusting a brightness of the image displayed by the display unit, based on first illuminance information indicating a detection result of the first illuminance detection unit, and, when a light modulating member adjusting the outside light incident on the display unit is mounted on the display device, detecting the illuminance by a second illuminance detection unit, and adjusting the brightness of the image based on second illuminance information indicating a detection result of the second illuminance detection unit.

DESCRIPTION OF EXEMPLARY EMBODIMENTS

Embodiments are described below with reference to the accompanying drawings.

1. First Embodiment

1-1. Overall Configuration of Display System

Figure 1:
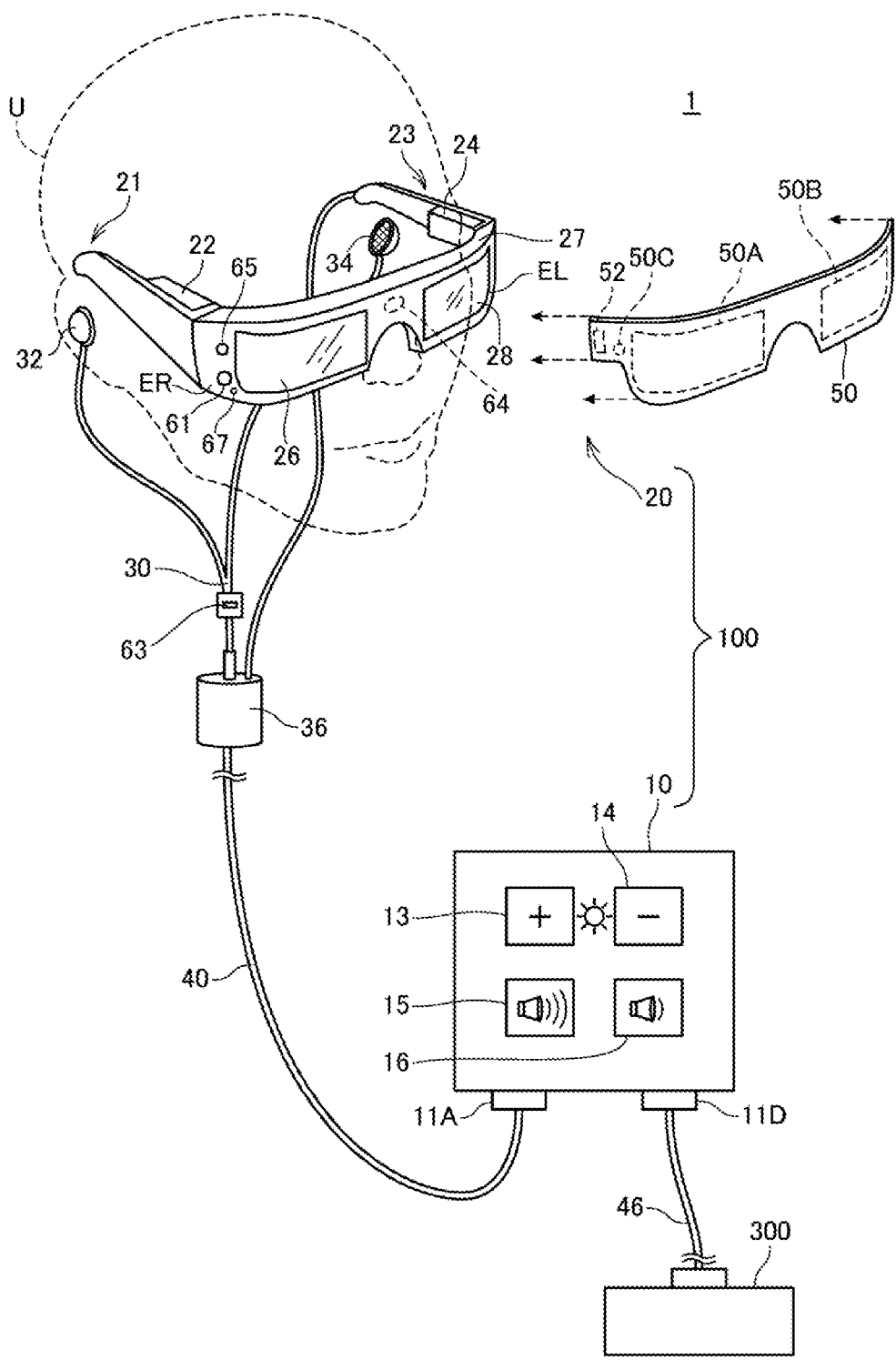
FIG. 1 is a diagram illustrating a configuration of a display system

FIG. 1 is a diagram illustrating an overall configuration of a display system 1.

As illustrated in FIG. 1, the display system 1 is provided with a head mounted display (HMD) 100. The HMD 100 is a device including an image display unit 20 mounted on a head of a user and a coupling device 10, and is a device for causing, using the image display unit 20, a virtual image to be visually recognized by the user while mounted on the head of the user. The HMD 100 corresponds to an example of a display device, and the image display unit 20 corresponds to an example of a display unit. In the following description, the user refers to a user who wears and uses the HMD 100.

The coupling device 10 includes a connector 11A and a connector 11D, on a box-shaped case. The image display unit 20 is connected to the connector 11A via a coupling cable 40. Hereinafter, when no distinction is made between the connectors 11A and 11D, the connectors 11A and 11D will be referred to as connectors 11. The case of the coupling device 10 can also be referred to as a housing or a main body.

The display system 1 is a system configured by connecting a smartphone 300 to the HMD 100. The connector 11D is an interface, of the HMD 100, by which the smartphone 300 is connected. In other words, in the present embodiment, the smartphone 300 is connected to the connector 11D. The smartphone 300 corresponds to an example of a control device. Note that the smartphone 300 is merely an example of the control device. It is sufficient that the control device be portable by a user, and be provided with a display unit that displays an image, a position input unit such as a touch sensor, a sensor for detecting an operation of the control device by the user, and a computer. For example, a personal digital assistant (PDA) terminal, a tablet personal computer, or the like can be connected to the coupling device 10 as the control device.

Each of the connectors 11 is a wired interface to which a communication cable is connected, and the coupling device 10 is connected to an external device via the communication cable. The connector 11A is provided with a terminal that connects to the coupling cable 40, and an interface circuit that transmits and receives signals via the connector 11A. The connector 11A is provided to connect the image display unit 20 to the coupling device 10. The coupling cable 40 supplies power from the coupling device 10 to the image display unit 20, and also has a function for the image display unit 20 and the coupling device 10 to mutually transmit and receive data.

The connector 11D is an interface for transmitting and receiving data between the coupling device 10 and the smartphone 300, and can be a known communication interface. Video data is input to the coupling device 10 from the smartphone 300 via the connector 11D. Further, the coupling device 10 can output sensor data to the smartphone 300 via the connector 11D. In the present embodiment, the connector 11D is a universal serial bus (USB) Type-C standard connector, and illustrates an example in which the smartphone 300 is connected via a USB cable 46.

An interface corresponding to USB Type-C is able to transmit data according to the USB 3.1 standard and supply a direct current within 20 volts and 5 amperes. As functions of a replacement mode for the USB Type-C, high definition multimedia interface (HDMI) standard video data, mobile high-definition ink (MHL) standard video data, and the like, can be transmitted. Via the USB cable 46, the smartphone 300 can supply power, perform data transmission and reception, supply streaming data for images and audio, and the like. The replacement mode for the USB Type-C is known as an alternative mode. HDMI is a registered trademark.

In the display system 1, the smartphone 300 plays content data recorded in a non-volatile storage unit. The smartphone 300 plays the content data and displays video and images on a display 330 (FIG. 5) provided in the smartphone 300. Further, the smartphone 300 can perform processing to output the video and images of the content data to the HMD 100. In this case, the video data is input to the coupling device 10 via the connector 11D, and the video or images based on the video data are displayed by the image display unit 20.

The image display unit 20 has an eyeglasses-like shape in the present embodiment. The image display unit 20 is provided with a right display unit 22, a left display unit 24, a right light-guiding plate 26, and a left light-guiding plate 28, on a main body that includes a right holding part 21, a left holding part 23, and a front frame 27.

The right holding part 21 and the left holding part 23 extend rearward from corresponding ends of the front frame 27, to hold the image display unit 20 on the head of a user U. Of both the ends of the front frame 27, the end positioned on the right side of the user U when the user U wears the image display unit 20 is referred to as an end ER, while the end positioned on the left side is referred to as an end EL. When the user wears the image display unit 20, the right holding part 21 is provided extending from the end ER of the front frame 27 to a position corresponding to the right side of the head of the user. When the user wears the image display unit 20, the left holding part 23 is provided extending from the end EL to a position corresponding to the left side of the head of the user.

The right light-guiding plate 26 and the left light-guiding plate 28 are provided on the front frame 27. The right light-guiding plate 26 is positioned in front of the right eye of the user when the user wears the image display unit 20, and causes the user to visually recognize an image with the right eye. The left light-guiding plate 28 is positioned in front of the left eye of the user when the user wears the image display unit 20, and causes the user to visually recognize an image with the left eye.

The front frame 27 has a shape formed by coupling an end of the right light-guiding plate 26 and an end of the left light-guiding plate 28 to each other, and this coupling position corresponds to a position between the eyebrows of the user when the user wears the image display unit 20.

The front frame 27 may include a nose pad provided at the coupling position of the right light-guiding plate 26 and the left light-guiding plate 28, and configured to come into contact with the nose of the user when the user wears the image display unit 20. In this case, the image display unit 20 can be held on the head of the user by the nose pad, the right holding part 21, and the left holding part 23. Further, a belt may also be coupled to the right holding portion 21 and the left holding portion 23 that fits to the back of the head of the user when the user wears the image display unit 20. In this case, the belt can firmly hold the image display unit 20 on the head of the user U.

Each of the right display unit 22 and the left display unit 24 is a module configured by unitizing an optical unit and a peripheral circuit.

The right display unit 22 is a unit relating to the image display by the right light-guiding plate 26, is provided on the right holding part 21 and is positioned near the right side of the head of the user in the mounted state. The left display unit 24 is a unit relating to the image display by the left light-guiding plate 28, is provided on the left holding part 23, and is positioned near the left side of the head of the user in the mounted state. Note that, the right display unit 22 and the left display unit 24 may be collectively and simply referred to as a "display driving unit".

Each of the right light-guiding plate 26 and the left light-guiding plate 28 is an optical component formed of a light-transmissive resin or the like, and is configured to guide imaging light output by the right display unit 22 and the left display unit 24 to the eye of the user. The right light-guiding plate 26 and the left light-guiding plate 28 are, for example, prisms.

The imaging light guided by the right light-guiding plate 26 and outside light transmitted through the right light-guiding plate 26 are incident on the right eye of the user. Similarly, the imaging light guided by the left light-guiding plate 28 and outside light transmitted through the left light-guiding plate 28 are incident on the left eye.

A DP illuminance sensor 65 is disposed on the front frame 27 of the image display unit 20. The DP illuminance sensor 65 receives the outside light from the front of the user wearing the image display unit 20, and is a sensor that outputs a detection value in accordance with an amount of received light. For example, a known environmental light sensor can be used, or the sensor may be a color sensor that can detect color temperature. The DP illuminance sensor 65 is installed facing in a direction in which the DP illuminance sensor 65 can detect the amount of the outside light that passes through the image display unit 20 and is incident on the eyes of the user U, when the user U wears the image display unit 20. The DP illuminance sensor 65 corresponds to an example of a first illuminance detection unit of the present disclosure.

A DP camera 61 is disposed on the front frame 27 of the image display unit 20. The DP camera 61 is provided in a position that does not obstruct the outside light passing through the right light-guiding plate 26 and the left light-guiding plate 28. In the example illustrated in FIG. 1, the DP camera 61 is disposed on the side of the end ER of the front frame 27, but the DP camera 61 may also be disposed on the side of the end EL, or may be disposed on a coupling portion between the right light-guiding plate 26 and the left light-guiding plate 28.

The DP camera 61 is a digital camera provided with an imaging element, such as a charge coupled device (CCD) or a complementary metal oxide semiconductor (CMOS), an imaging lens, and the like. The DP camera 61 is installed facing to the front of the image display unit 20, and captures an imaging range that overlaps with an outside scene visible by the user U through the image display unit 20. In other words, the outside scene visible by the user U may be included in the imaging range of the DP camera 61, or the outside scene visible by the user U and an angle of view of the DP camera 61 may overlap with each other. The DP camera 61 according to the present embodiment is a monocular camera, but may be a stereo camera. The DP camera 61 may be provided with a zoom mechanism or may be provided with a wide angle lens. The DP camera 61 corresponds to an image capture unit of the present disclosure.

A light emitting diode (LED) indicator 67 is disposed on the front frame 27. The LED indicator 67 is disposed in the vicinity of the DP camera 61 at the end ER, and illuminates while the DP camera 61 is operating in order to perform notification that the image capture is being performed.

A distance sensor 64 is provided on the front frame 27. The distance sensor 64 detects a distance to a measurement target object positioned in a pre-set measurement direction. The distance sensor 64 may be a light reflective distance sensor that includes a light source, such as an LED or a laser diode, and a light-receiving unit that receives light emitted from the light source and reflected from the measurement target object. Alternatively, the distance sensor 64 may be an ultrasonic distance sensor that includes a sound source that generates ultrasonic waves, and a detector that receives the ultrasonic waves reflected by the measurement target object. Further, the distance sensor 64 may be a laser range scanner. In this case, a wider region including an area in front of the image display unit 20 can be measured.

The HMD 100 is provided with a shade 50 that is detachably mounted on the image display unit 20. The shade 50 is a cover that is attached while being overlaid on the front side of the image display unit 20 so as to cover the right display unit 22 and the left display unit 24. The shade 50 dims or blocks the outside light incident on the right light-guiding plate 26 and the left light-guiding plate 28, respectively, in a region 50A overlapping the right light-guiding plate 26 and a region 50B overlapping the left light-guiding plate 28. In other words, the shade 50 dims or blocks the outside light in a range including the regions 50A and 50B. The shade 50 corresponds to an example of a light modulating member of the present disclosure.

The image display unit 20 displays video or an image superimposed on the outside light transmitted through the right light-guiding plate 26 and the left light-guiding plate 28. Thus, the visibility of the display image formed by the right display unit 22 and the left display unit 24 is affected by a ratio between the brightness of the display image and the amount of outside light transmitted through the right light-guiding plate 26 and the left light-guiding plate 28. Specifically, when the brightness of the display image of the image display unit 20 is low compared to the amount of outside light, the visibility of the display image is low. Conversely, when the brightness of the display image of the image display unit 20 is high compared to the amount of outside light, the visibility of the display image is high.

The shade 50 has the effect of increasing the visibility of the display image of the image display unit 20 and increasing the contrast of the display image of the image display unit 20, by reducing the amount of outside light incident on the image display unit 20. Transmittance of the outside light by the shade 50 and transmission wavelength characteristics are collectively referred to as transmission characteristics.

The transmission characteristics of the shade 50 are arbitrarily set. Of the shade 50, the transmission characteristics in the region 50A and the region 50B affect the visibility of the display image of the image display unit 20, but the entire shade 50 may have the same transmission characteristics.

The shade 50 covers the DP illuminance sensor 65 when mounted on the image display unit 20. In other words, the shade 50 has a shape that covers the right light-guiding plate 26, the left light-guiding plate 28, and the DP illuminance sensor 65, and dims or blocks the outside light incident on these members. Thus, the detection value of the DP illuminance sensor 65 when the shade 50 is mounted is a detection value of the illuminance of the outside light transmitted through the shade 50. Note that transmission characteristics of a region 50C overlapping with the DP illuminance sensor 65 are the same as those of the regions 50A and 50B, for example. The detection value of the DP illuminance sensor 65 corresponds to an example of first illuminance information.

The shade 50 includes a magnet 52. The magnet 52 may be a permanent magnet, such as a neodymium magnet, or may be an electromagnet. When the shade 50 is mounted on the image display unit 20, a detection value of a DP magnetic sensor 237, to be described below, drifts due to the magnetic attraction of the magnet 52. Thus, the presence or absence of the shade 50 can be detected on the basis of the detection value of the DP magnetic sensor 237.

Each of the right display unit 22 and the left display unit 24 of the image display unit 20 is connected to the coupling device 10. In the HMD 100, the coupling cable 40 is connected to the left holding part 23, and wiring leading to the coupling cable 40 is laid inside the image display unit 20 to connect each of the right display unit 22 and the left display unit 24 to the coupling device 10.

The coupling cable 40 is provided with an audio connector 36, and a headset 30 that includes stereo headphones including a right earphone 32 and a left earphone 34, and a microphone 63, is connected to the audio connector 36. The right earphone 32 is worn on the right ear of the user and the left earphone 34 is worn on the left ear of the user. The right earphone 32 and the left earphone 34 can also be referred to as a sound output unit.

The right earphone 32 and the left earphone 34 output sound on the basis of sound signals output from the coupling device 10.

The microphone 63 collects sound and outputs sound signals to the coupling device 10. The microphone 63 may be, for example, a monaural microphone or a stereo microphone, and may be a directional microphone or a non-directional microphone.

The coupling device 10 is provided with a brightness adjusting key 13, a brightness adjusting key 14, a volume adjusting key 15, and a volume adjusting key 16, as operated components operated by the user. Each of the brightness adjusting key 13, the brightness adjusting key 14, the volume adjusting key 15, and the volume adjusting key 16 is configured by a hardware key. These operated components are disposed on the surface of the main body of the coupling device 10, and are operated by the fingers of the user, for example.

The brightness adjusting keys 13 and 14 are hardware keys for adjusting a display brightness of the video displayed by the image display unit 20. The brightness adjusting key 13 instructs an increase in the brightness, and the brightness adjusting key 14 instructs a reduction in the brightness. The volume adjusting keys 15 and 16 are hardware keys for adjusting a volume of the sound output from the right earphone 32 and the left earphone 34. The volume adjusting key 15 instructs an increase in volume, and the volume adjusting button 16 instructs a reduction in volume.

1-2. Configuration of Optical System of Image Display Unit of HMD

Figure 2:
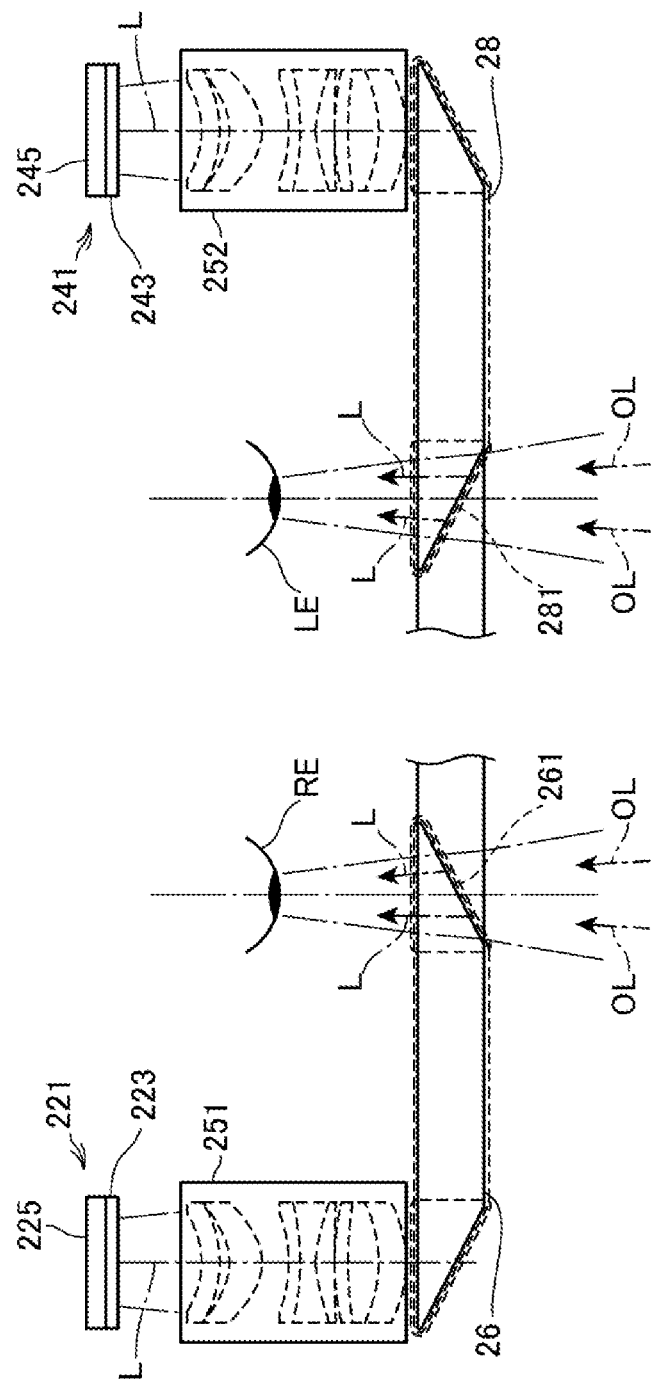
FIG. 2 is a diagram illustrating a configuration of an optical system of an image display unit.

FIG. 2 is a plan view of main components illustrating a configuration of an optical system provided in the image display unit 20. In FIG. 2, a left eye LE and a right eye RE of the user are illustrated for explanation.

As illustrated in FIG. 2, the right display unit 22 and the left display unit 24 are disposed symmetrically on the right- and left-hand sides. As a configuration causing the right eye RE of the user to visually recognize the image, the right display unit 22 is provided with an organic light emitting diode (OLED) unit 221 that emits imaging light. Further, the right display unit 22 is provided with a right optical system 251 provided with a lens group that guides imaging light L emitted by the OLED unit 221, and the like. The imaging light L is guided by the right optical system 251 to the right light-guiding plate 26.

Figure 4:
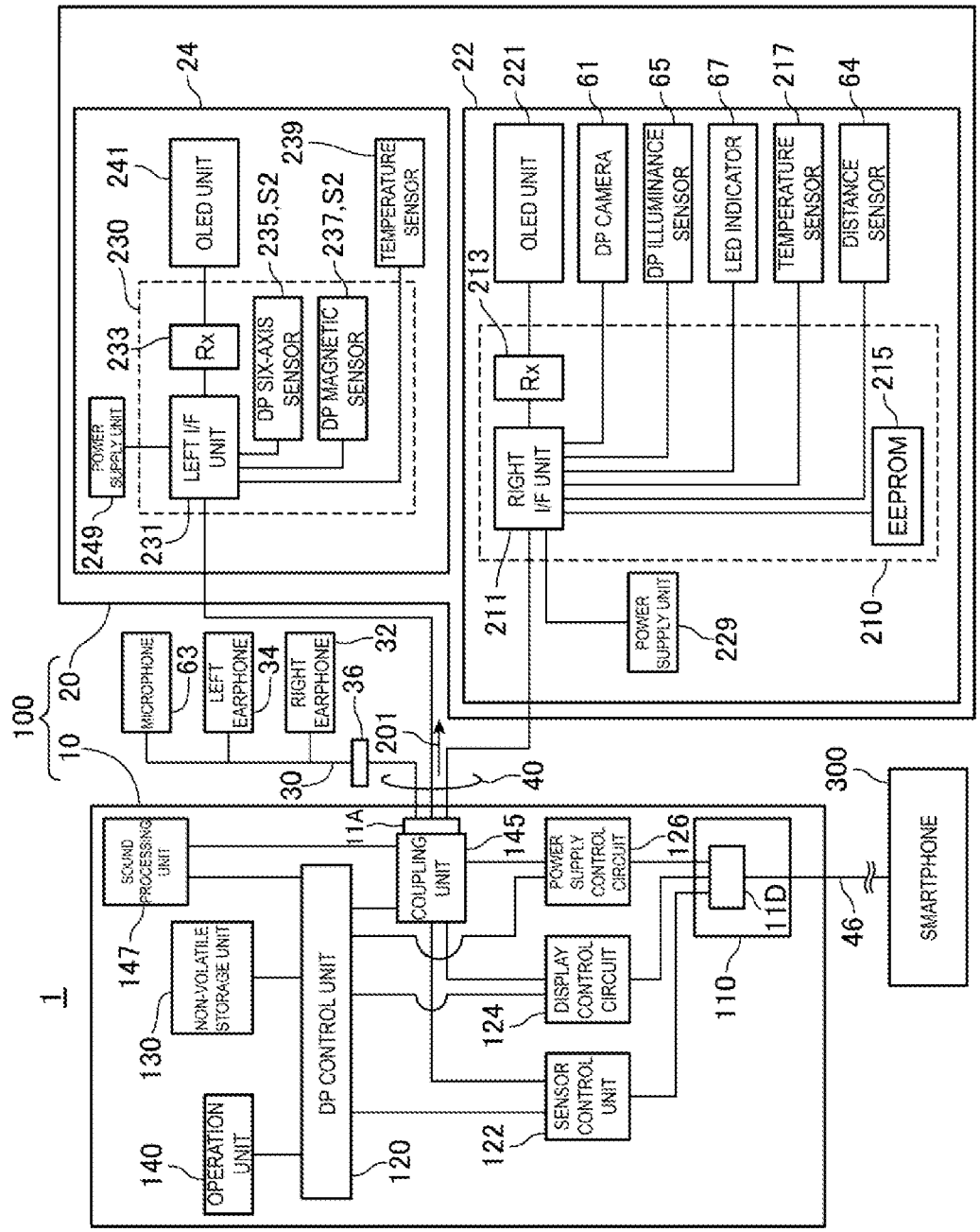
FIG. 4 is a diagram illustrating a configuration of each of components configuring an HMD.

The OLED unit 221 includes an OLED panel 223 and an OLED drive circuit 225 that drives the OLED panel 223. The OLED panel 223 is a spontaneous emission type display panel configured by arranging, in a matrix, light-emitting elements that emit light as a result of organic electro-luminescence to emit red (R) color light, green (G) color light, and blue (B) color light. respectively. The OLED panel 223 is provided with a plurality of pixels, where one pixel is a unit including one R element, one G element, and one B element, and forms an image using the pixels arranged in the matrix. In accordance with control by a DP control unit 120, the OLED drive circuit 225 selects and supplies power to the light-emitting elements provided in the OLED panel 223, thus causing the light-emitting elements of the OLED panel 223 to emit light. The DP control unit 120 will be described below with reference to FIG. 4. The OLED drive circuit 225 is fixed by bonding or the like to a rear face of the OLED panel 223, namely, a back side of a light-emitting surface of the OLED panel 223. The OLED drive circuit 225 may be configured, for example, by a semiconductor device that drives the OLED panel 223, and may be mounted on a substrate (not illustrated) fixed to the rear face of the OLED panel 223. A temperature sensor 217 illustrated in FIG. 4 is mounted on this substrate.

Note that the OLED panel 223 may include a configuration in which light-emitting elements that emit white color light are disposed in a matrix, and color filters respectively corresponding to the R color, the G color, and the B color are disposed so as to be superimposed on the light-emitting elements. Further, the OLED panel 223 of a WRGB configuration may be used, which is provided with light-emitting elements that emit white (W) color light, in addition to the light-emitting elements configured to respectively emit the R color light, the G color light, and the B color light.

The right optical system 251 includes a collimate lens that collimates the imaging light L emitted from the OLED panel 223. The imaging light L collimated by the collimate lens enters the right light-guiding plate 26. In an optical path that guides light inside the right light-guiding plate 26, a plurality of reflective faces are formed that reflect the imaging light L. The imaging light L is reflected a plurality of times inside the right light-guiding plate 26 and then, is guided to the right eye RE side. In the right light-guiding plate 26, a half mirror 261 (a reflective face) positioned in front of the right eye RE is formed. The imaging light L is reflected by the half mirror 261 so as to be emitted from the right light-guiding plate 26 toward the right eye RE, and this imaging light L forms an image on a retina of the right eye RE, and causes the user to visually recognize the image.

Further, as a configuration causing the left eye LE of the user to visually recognize the image, the left display unit 24 includes an OLED unit 241 that emits imaging light, and a left optical system 252 provided with a lens group that guides the imaging light L emitted by the OLED unit 241, and the like. The imaging light L is guided by the left optical system 252 to the left light-guiding plate 28.

The OLED unit 241 includes an OLED panel 243, and an OLED drive circuit 245 that drives the OLED panel 243. The OLED panel 243 is a spontaneous emission type display panel configured in a manner similar to the OLED panel 223. In accordance with control by the DP control unit 120, the OLED drive circuit 245 selects and supplies power to the light-emitting elements provided in the OLED panel 243, thus causing the light-emitting elements of the OLED panel 243 to emit light. The OLED drive circuit 245 is fixed by bonding or the like to a rear face of the OLED panel 243, namely, a back side of a light-emitting surface of the OLED panel 243. The OLED drive circuit 245 may be configured, for example, by a semiconductor device that drives the OLED panel 243, and may be mounted on a substrate (not illustrated) fixed to the rear face of the OLED panel 243. A temperature sensor 239 illustrated in FIG. 4 is mounted on this substrate.

The left optical system 252 includes a collimate lens that collimate the imaging light L emitted from the OLED panel 243. The imaging light L collimated by the collimate lens enters the left light-guiding plate 28. The left light-guiding plate 28 is an optical element in which a plurality of reflective faces are formed that reflect the imaging light L, and is, for example, a prism. The imaging light L is reflected a plurality of times inside the left light-guiding plate 28 and then, is guided to the left eye LE side. In the left light-guiding plate 28, a half mirror 281 positioned in front of the left eye LE is formed. The imaging light L is reflected by the half mirror 281 so as to be emitted from the left light-guiding plate 28 toward the left eye LE, and this imaging light L forms an image on a retina of the left eye LE, and causes the user to visually recognize the image.

According to this configuration, the HMD 100 functions as a transmissive display device. In other words, the imaging light L reflected by the half mirror 261 and outside light OL transmitted through the right light-guiding plate 26 are incident on the right eye RE of the user. Further, the imaging light L reflected by the half mirror 281 and the outside light OL transmitted through the half mirror 281 are incident on the left eye LE. In this way, the HMD 100 superimposes the imaging light L of the image processed internally and the outside light OL on each other, and causes the imaging light L and the outside light OL superimposed on each other to be incident on the eyes of the user. The user can view the outside scene through the right light-guiding plate 26 and the left light-guiding plate 28, and visually recognizes the image formed by the imaging light L and superimposed on this outside scene.

The half mirrors 261 and 281 are image extracting units that respectively reflect the imaging light output by the right display unit 22 and the left display unit 24 to extract images, and can be referred to as a display unit.

Note that the left optical system 252 and the left light-guiding plate 28 are collectively referred to as a "left light-guiding unit", and the right optical system 251 and the right light-guiding plate 26 are collectively referred to as a "right light-guiding unit". The configuration of the right light-guiding unit and the left light-guiding unit is not limited to the example described above, and any method can be used as long as imaging light is used to form a virtual image in front of the eyes of the user. For example, a diffraction grating may be used, or a semi-transmissive reflection film may be used.

Figure 3:
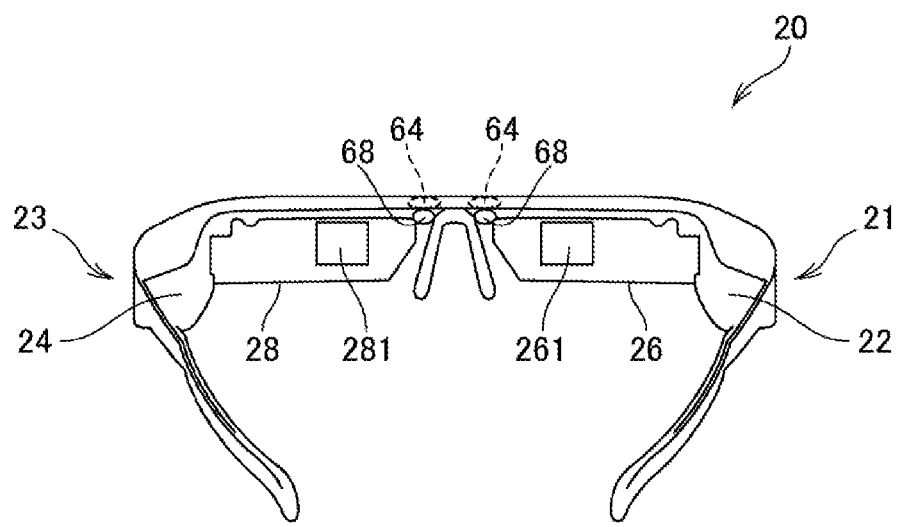
FIG. 3 is a perspective view illustrating a configuration of main components of the image display unit.

FIG. 3 is a diagram illustrating a configuration of main components of the image display unit 20. FIG. 3 is a perspective view of the main components of the image display unit 20 as seen from a head side of the user. Note that, in FIG. 3, illustration of the coupling cable 40 is omitted.

FIG. 3 illustrates a side of the image display unit 20 that comes into contact with the head of the user, that is, a side seen by the right eye RE and the left eye LE of the user. In other words, in FIG. 3, rear sides of the right light-guiding plate 26 and the left light-guiding plate 28 are visible.

In FIG. 3, the half mirror 261 that irradiates the right eye RE of the user with the imaging light and the half mirror 281 that irradiates the left eye LE with the imaging light are visible as substantially square-shaped regions. Further, the whole of the right light-guiding plate 26 including the half mirror 261, and the whole of the left light-guiding plate 28 including the half mirror 281 transmit the outside light, as described above. Thus, the user visually recognizes the outside scene through the whole of the right light-guiding plate 26 and the left light-guiding plate 28, and visually recognizes rectangular display images at positions of the half mirrors 261 and 281.

Further, inner cameras 68 are disposed on the user side of the image display unit 20. A pair of the inner cameras 68 are provided in a central position between the right light-guiding plate 26 and the left light-guiding plate 28 so as to correspond, respectively, to the right eye RE and the left eye LE of the user. The inner cameras 68 are a pair of cameras that respectively capture images of the right eye RE and the left eye LE of the user. The inner cameras 68 capture the images in accordance with instructions from the DP control unit 120. The DP control unit 120 analyzes captured image data of the inner cameras 68. For example, the DP control unit 120 detects the reflected light or an image of the pupil on the surfaces of the eyeballs of the right eye RE and the left eye LE from the imaging data of the inner cameras 62, and determines a sight line direction of the user. Further, the DP control unit 120 can determine a change in the sight line direction of the user, and may detect the eyeball movement of each of the right eye RE and the left eye LE.

Here, a movement in the user's sight line can also be considered to be a movement of the user's virtual viewpoint.

Further, when detecting the sight line direction of the right eye RE and the left eye LE from the captured images of the inner cameras 68, the DP control unit 120 can determine a convergence angle of the right eye RE and the left eye LE. The convergence angle corresponds to a distance to an object on which the user is focused. In other words, when the user stereoscopically views the image or the object, the convergence angle of the right eye RE and the left eye LE is determined in accordance with the distance to the object being viewed. Accordingly, the distance to the object on which the user is focused can be determined by detecting the convergence angle. Further, by displaying the image so as to manipulate the convergence angle of the user, a stereoscopic view can be induced.

1-3. Configuration of Each Component of HMD

FIG. 4 is a diagram illustrating a configuration of each of components configuring the HMD 100.

The right display unit 22 of the image display unit 20 includes a right display unit substrate 210. A right I/F unit 211 connected to the coupling cable 40, a reception unit 213 that receives data input from the coupling device 10 via the right I/F unit 211, and an electrically erasable programmable read only memory (EEPROM) 215 are mounted on the right display unit substrate 210. The right I/F unit 211 connects the reception unit 213, the EEPROM 215, the temperature sensor 217, the DP camera 61, the distance sensor 64, the DP illuminance sensor 65, the LED indicator 67, and the inner cameras 68 to the coupling device 10. The reception unit 213 connects the OLED unit 221 to the coupling device 10.

The left display unit 24 includes a left display unit substrate 230. A left I/F unit 231 connected to the coupling cable 40, and a reception unit 233 that receives data input from the coupling device 10 via the left I/F unit 231 are mounted on the left display unit substrate 230. Further, a DP six-axis sensor 235 and the DP magnetic sensor 237 are mounted on the left display unit substrate 230.

The left I/F unit 231 connects the reception unit 233, the DP six-axis sensor 235, the DP magnetic sensor 237, and a temperature sensor 239 to the coupling device 10. The reception unit 233 connects the OLED unit 241 to the coupling device 10.

I/F is an abbreviation for interface. Note that in the present embodiment, the reception unit 213 and the reception unit 233 may be respectively referred to as the Rx 213 and the Rx 233.

The EEPROM 215 stores various types of data in a non-volatile manner. The EEPROM 215 stores, for example, data relating to light-emitting characteristics and display characteristics of the OLED units 221 and 241 provided in the image display unit 20, data relating to characteristics of sensors provided in the right display unit 22 or the left display unit 24, and the like.

Specifically, the EEPROM 215 stores parameters regarding gamma correction of the OLED units 221 and 241, data used to compensate for detection values of the temperature sensors 217 and 239, and the like. These kinds of data are generated by inspection at the time of factory shipment of the HMD 100, and are written into the EEPROM 215. The data stored in the EEPROM 215 can be read by the DP control unit 120.

The DP camera 61 performs image capture in accordance with a signal input via the right I/F unit 211, and outputs captured image data to the right I/F unit 211.

The DP illuminance sensor 65 receives the outside light and outputs a detection value corresponding to an amount of the received light or an intensity of the received light. The LED indicator 67 illuminates in accordance with a control signal or a driving current input via the right I/F unit 211.

The inner cameras 68 perform image capture in accordance with a signal input via the right I/F unit 211, and output captured image data to the right I/F unit 211.

The temperature sensor 217 detects a temperature of the OLED unit 221, and outputs a voltage value or a resistance value corresponding to the detected temperature, as a detection value.

The distance sensor 64 performs distance detection, and outputs a signal indicating the detection result to the coupling device 10 via the right I/F unit 211. As the distance sensor 64, for example, an infrared ray type depth sensor, an ultrasonic type distance sensor, a Time Of Flight distance sensor, a distance detecting unit configured to combine image detection and sound detection, or the like can be used. Alternatively, the distance sensor 64 may be configured to detect the distance by processing an image obtained by stereo photography using a stereo camera or monocular cameras.

The reception unit 213 receives video data for display transmitted from the coupling device 10 via the right I/F unit 211, and outputs the received video data to the OLED unit 221. The OLED unit 221 displays video on the basis of the video data transmitted by the coupling device 10.

Further, the reception unit 233 receives video data for display transmitted from the coupling device 10 via the left I/F unit 231, and outputs the received video data to the OLED unit 221. The OLED unit 241 displays video on the basis of the video data transmitted by the coupling device 10.

The DP six-axis sensor 235 is a six-axis motion sensor provided with a three-axis acceleration sensor and a three-axis gyro sensor. An inertial measurement unit (IMU) including the above-described sensors as modules may be employed as the DP six-axis sensor 235. The DP magnetic sensor 237 is a three-axis geomagnetic sensor, for example. A gyro sensor is also referred to as an angular velocity sensor. In the following description, the three-axis acceleration sensor of the DP six-axis sensor 235 may be described as a second acceleration sensor. The detection value of the DP magnetic sensor 237 is affected by changes in a surrounding magnetic field. For example, when the shade 50 is mounted on the image display unit 20, as described above, the effect of the magnet 52 causes the detection value of the DP magnetic sensor 237 to vary.

The temperature sensor 239 detects a temperature of the OLED unit 241, and outputs a voltage value or a resistance value corresponding to the detected temperature, as a detection value.

Each of the components of the image display unit 20 operates as a result of power supplied from the coupling device 10 via the coupling cable 40.

The image display unit 20 is provided with a power supply unit 229 on the right display unit 22, and a power supply unit 249 on the left display unit 24. The power supply unit 229 distributes and supplies the power supplied by the coupling device 10 via the coupling cable 40 to each of the components of the right display unit 22, including the right display unit substrate 210. Similarly, the power supply unit 249 distributes and supplies the power supplied by the coupling device 10 via the coupling cable 40 to each of the components of the left display unit 24, including the left display unit substrate 230. The right display unit 22 and the left display unit 24 may be provided with a conversion circuit or the like that converts a voltage.

The coupling device 10 includes an I/F unit 110, the DP control unit 120, a sensor control circuit 122, a display control circuit 124, a power control circuit 126, a non-volatile storage unit 130, an operation unit 140, a coupling unit 145, and a sound processing unit 147.

The I/F unit 110 is provided with a connector 11D. Further, the I/F unit 110 is provided with an interface circuits connected to the connector 11D and configured to execute communication protocols conforming to respective communication standards.

The I/F unit 110 may be, for example, an interface substrate on which the connector 11D and the interface circuit are mounted. Further, a configuration may be employed in which the DP control unit 120, the sensor control circuit 122, the display control circuit 124, and the power control circuit 126 of the coupling device 10 are mounted on a coupling device main substrate (not illustrated). In this case, the connector 11D of the I/F unit 110 and the interface circuit may be mounted on the coupling device main substrate.

Further, the I/F unit 110 may be provided, for example, with an interface for a memory card capable of being connected to an external storage device or storage medium, or the I/F unit 110 may be configured by a wireless communication interface.

The DP control unit 120 controls each of the components of the HMD 100. The DP control unit 120 includes a processor such as a central processing unit (CPU), for example. As a result of the processor executing a control program, the DP control unit 120 controls each of the components of the HMD 100 in concert with software and hardware. The DP control unit 120 is connected to the non-volatile storage unit 130, the operation unit 140, the coupling unit 145, and the sound processing unit 147.

The sensor control circuit 122 controls the DP camera 61, the distance sensor 64, the DP illuminance sensor 65, the temperature sensor 217, the DP six-axis sensor 235, the DP magnetic sensor 237, and the temperature sensor 239. Specifically, under the control of the DP control unit 120, the sensor control circuit 122 performs setting and initialization of a sampling period of each of the sensors, and, with respect to each of the sensors, supplies power, transmits control data, acquires detection values, and the like, in accordance with the sampling period of each of the sensors.

The sensor control circuit 122 is connected to the connector 11D of the I/F unit 110, and outputs data relating to the detection values acquired from each of the sensors to the connector 11D at preset timings. The smartphone 300 connected to the connector 11D can acquire the detection value of each of the sensors of the HMD 100. For example, the smartphone 300 can obtain the detection value of the DP illuminance sensor 65, the detection value of the DP magnetic sensor 237, the captured image data of the DP camera 61, and the like.

The display control circuit 124 executes various types of processing to display, by the image display unit 20, an image based on the image data and video data input to the I/F unit 110. In the present embodiment, a video signal output by the smartphone 300 is input to the connector 11D. The video signal is digital video data, but may be an analog video signal.

For example, the display control circuit 124 executes various types of processing, such as cutting out a frame, resolution conversion, intermediate frame generation, frame rate conversion, and the like. Resolution conversion includes so-called scaling. The display control circuit 124 outputs, to the coupling unit 145, image data corresponding to each of the OLED unit 221 and the OLED unit 241. The image data input to the coupling unit 145 is transmitted from the connector 11A to the right I/F portion 211 and the left I/F portion 231 as a video signal 201. The video signal 201 is digital video data processed to be compatible with each of the OLED unit 221 and the OLED unit 241.

In the present embodiment, the connector 11D is configured by a USB Type-C connector. Via the connector 11D, the display control circuit 124 receives video data transmitted in the alternative USB Type-C mode.

Further, the display control circuit 124 controls a display brightness in the image display unit 20. Specifically, the display control circuit 124 adjusts a light emission brightness of the OLED units 221 and 241, and a gray scale value of the image output to the OLED units 221 and 241, in accordance with a display brightness adjustment value. In this way, the display control circuit 124 adjusts the brightness of the image displayed in the right display unit 22 and the left display unit 24. The display brightness adjustment value is input, for example, from the smartphone 300.

The sensor control circuit 122 and/or the display control circuit 124 may be realized by hardware using an integrated circuit, or may be realized through a combination of software and hardware by a processor executing a program. In other words, the sensor control circuit 122 and the display control circuit 124 are configured by a processor, and the processor performs the above-described operations by executing the program. In this example, the sensor control circuit 122 and the display control circuit 124 may be realized by the processor configuring the DP control unit 120 executing the program. In other words, the processor may function as the DP control unit 120, the display control circuit 124, and the sensor control circuit 122 by executing the program. Here, the processor can also be referred to as a computer.

Further, each of the display control circuit 124 and the sensor control unit 122 may be configured by programmed hardware such as a digital signal processor (DSP), a field programmable gate array (FPGA), or the like. Further, the sensor control circuit 122 and the display control circuit 124 may be integrated, and configured as a system-on-a-chip (SoC)-FPGA.

The power control circuit 126 is connected to the connector 11D. Based on power supplied from the connector 11D, the power control circuit 126 supplies power to each of the components of the coupling device 10, and to the image display unit 20. Further, the power control circuit 126 may be provided with a voltage conversion circuit (not illustrated), and may be configured to convert the voltage and supply the voltage to each of the components of the coupling device 10 and the image display unit 20. The power control circuit 126 may be configured by a programmed semiconductor device, such as a logic circuit, an FPGA, or the like. Further, the power control circuit 126 may be configured by hardware common to the sensor control circuit 122 and/or the display control circuit 124.

Each of the sensor control circuit 122, the display control circuit 124, and the power control circuit 126 may be provided with a work memory for executing data processing, and may execute processing using a memory of the DP control unit 120.

The operation unit 140 detects an operation on the operated components provided in the coupling device 10, and outputs, to the DP control unit 120, data indicating content of the operation, or an operation signal indicating the operated component that has been operated.

The sound processing unit 147 generates a sound signal in accordance with sound data input from the DP control unit 120, and outputs the sound signal to the coupling unit 145. This sound signal is output from the coupling unit 145 to the right earphone 32 and the left earphone 34 via the audio connector 36. Further, the sound processing unit 147 adjusts the volume of the sound signal in accordance with the control of the DP control unit 120. Further, the sound processing unit 147 generates sound data of sound collected by the microphone 63, and outputs the sound data to the DP control unit 120. This voice data may be processed by the DP control unit 120 in the same manner as the detection values of the sensors provided in the image display unit 20.

Further, the coupling device 10 may be provided with a battery (not illustrated), and a configuration may be adopted in which power is supplied to each of the components of the coupling device 10 and the image display unit 20 from this battery. The battery provided in the coupling device 10 may be a rechargeable secondary battery.

1-4. Configuration of Smartphone

Figure 5:
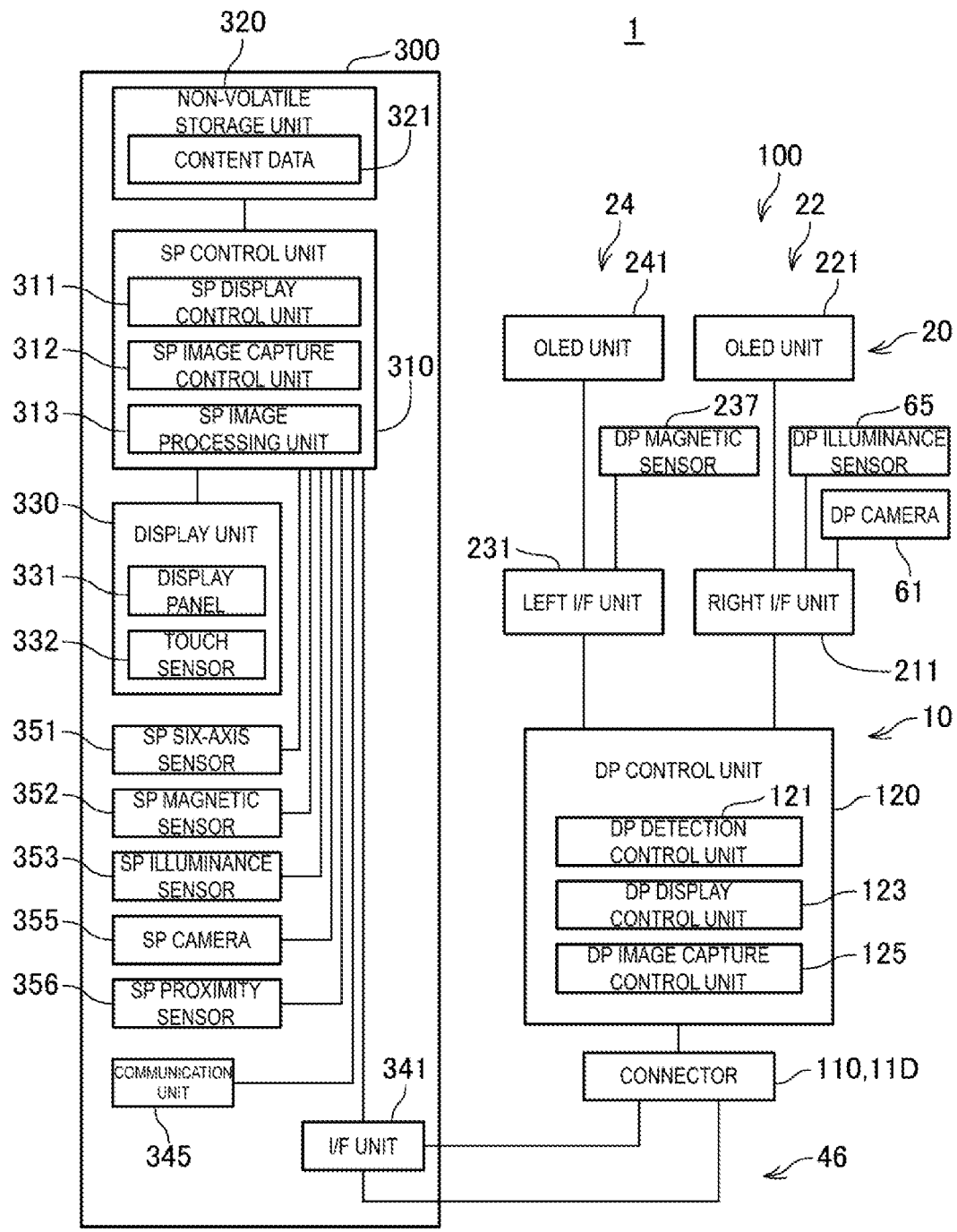
FIG. 5 is a configuration diagram of main components of the display system.

FIG. 5 is a configuration diagram of main components of the display system 1, and particularly illustrates a detailed configuration of the smartphone 300 and the main components of the HMD 100.

As illustrated in FIG. 5, the smartphone 300 is provided with an SP control unit 310, a non-volatile storage unit 320, a display unit 330, an I/F unit 341, a communication unit 345, an SP six-axis sensor 351, an SP magnetic sensor 352, and an SP illuminance sensor 353.

The SP control unit 310 is provided with a processor, such as a CPU or a microcomputer, and each of the components of the smartphone 300 is controlled by this processor executing a control program. The SP control unit 310 may be provided with a read only memory (ROM) that stores, in a non-volatile manner, the control program executed by the processor, and a memory, such as a random access memory (RAM), that configures a work area of the processor. The processor corresponds to an example of a computer. The control program stored in the memory of the SP control unit 310 corresponds to an example of a control program.

The non-volatile storage unit 320 stores, in a non-volatile manner, the program to be executed by the SP control unit 310 and data to be processed by the SP control unit 310. The non-volatile storage unit 130 is, for example, a magnetic recording device such as a hard disk drive (HDD), or is a storage device using a semiconductor storage element, such as a flash memory.

The non-volatile storage unit 320 stores, for example, content data 321 of content including video. The content data 321 is a file in a format that can be processed by the SP control unit 310, includes video data, and may also include audio data.

Further, the non-volatile storage unit 320 stores an operating system (OS) as a basic control program executed by the SP control unit 310, an application program that operates using the OS as a platform, and the like. Further, the non-volatile storage unit 320 stores data processed during execution of the application program, data of processing results, and the like.

The display panel 331 and the touch sensor 332 provided in the display unit 330 are connected to the SP control unit 310. The display panel 331 displays various images on the basis of the control of the SP control unit 310. The display panel 331 is configured by a liquid crystal display (LCD), for example. The display panel 331 is configured in a rectangular shape. In the present embodiment, the display panel 331 has a rectangular shape.

The touch sensor 332 detects a touch operation and outputs data indicating the detected operation to the SP control unit 310. The touch sensor 332 is integrally formed with the display panel 331. Specifically, the touch sensor 332 is formed on an image display surface of the display panel 331. In the present embodiment, the touch sensor 332 has a rectangular shape. Data output by the touch sensor 332 is coordinate data or the like indicating an operating position on the touch sensor 332.

The I/F unit 341 is an interface that is connected to an external device. The I/F unit 341 performs communication compliant with, for example, standards of an HDMI interface, a USB interface, or the like. The I/F unit 341 is provided with a connector connected to the USB cable 46, and an interface circuit that processes signals transmitted via the connector. The I/F unit 341 is an interface substrate including the connector and the interface circuit, and is connected to a main substrate on which the processor and the like of the SP control unit 310 are mounted. Alternatively, the connector and the interface circuit configuring the I/F unit 341 are mounted on a main substrate of the smartphone 300.

In the present embodiment, the I/F unit 341 is provided with the USB interface, and is connected to the connector 11D by the USB cable 46. For example, via the USB cable 46, the SP control unit 310 outputs the video data, and receives data relating to output values of the sensors and the like from the coupling device 10.

Alternatively, the I/F unit 341 may be a wireless communication interface. In this case, the I/F unit 341 can be an interface substrate on which a communication circuit including a radio frequency (RF) unit is mounted, or can be a circuit mounted on a main substrate.

The communication unit 345 is a communication interface that performs data communication with an external device. The communication unit 345 may be a wired communication interface to which a cable can be connected, or may be a wireless communication interface. For example, the communication unit 345 may be a wired LAN interface supporting Ethernet (registered trademark), or a wireless LAN interface supporting IEEE802.11 standards.

Further, the communication unit 345 is, for example, a communication interface that connects to another smartphone via a wireless telephone line.

The SP six-axis sensor 351 is a motion sensor provided with a three-axis acceleration sensor and a three-axis gyro sensor. The SP six-axis sensor 351 may be an IMU in which the sensors described above are provided as a module. The SP magnetic sensor 352 is a three-axis geomagnetic sensor, for example. The gyro sensor is also referred to as an angular velocity sensor. In the following description, the three-axis acceleration sensor of the SP six-axis sensor 351 may be described as a first acceleration sensor. The SP six-axis sensor 351 and the SP magnetic sensor 352 correspond to an example of a motion sensor of the present disclosure.

The SP illuminance sensor 353 receives outside light and outputs a detection value corresponding to an amount of the received light or an intensity of the received light. The SP illuminance sensor 353 receives the outside light from a direction of the normal line of the display panel 331, for example. The SP illuminance sensor 353 corresponds to an example of a second illuminance detection unit of the present disclosure.

An SP camera 355 is a digital camera provided with an imaging element, such as a CCD or a CMOS, an imaging lens, and the like. The SP camera 355 may be a monocular camera or a stereo camera. The SP camera 355 captures an image in accordance with control by the SP control unit 310, and outputs captured image data to the SP control unit 310.

An SP proximity sensor 356 is installed at a predetermined location on the main body surface of the smartphone 300, and detects an object that is closer to the smartphone 300 than a predetermined distance, or an object that is in contact with the smartphone 300. The SP proximity sensor 356 can, for example, be an inductive proximity sensor that detects magnetic loss due to eddy currents, or a capacitive proximity sensor that detects changes in electrostatic capacitance generated between the object to be detected and the sensor.

The SP control unit 310 is provided with an SP display control unit 311, an SP image capture control unit 312, and an SP image processing unit 313. Specifically, the SP control unit 310 functions as the SP display control unit 311, the SP image capture control unit 312, and the SP image processing unit 313 by the processor provided in the SP control unit 310 executing the control program. The SP display control unit 311 corresponds to an example of a display control unit of the present disclosure. The SP image processing unit 313 corresponds to an example of an image processing unit of the present disclosure.

The SP display control unit 311 replays the content data 321, and displays, on the display panel 331 of the display unit 330, images corresponding to the video data included in the content data 321. Further, via the I/F unit 341 and the connector 11D, the SP display control unit 311 transmits, to the DP control unit 120 of the HMD 100, data of the images based on the video data that may be included in the content data 321. In this way, the display system 1 performs mirroring display on both the display 330 of the smartphone 300 and on the image display unit 20, in which the video or the images of the content data 321 are displayed. Further, the SP control unit 310 can cause the video or the images of the content data 321 to be displayed only on the image display unit 20, without displaying the video or the images of the content data 321 on the display 330.

Further, via the I/F unit 341, the SP display control unit 311 transmits, to the coupling device 10, an illuminance request command requesting the DP control unit 120 to transmit the detection value of the DP illuminance sensor 65 provided in the image display unit 20. When the DP control unit 120 transmits the detection value of the DP illuminance sensor 65 in response to the illuminance request command, the SP display control unit 311 acquires the transmitted detection value. On the basis of the detection value of the DP illuminance sensor 65, the SP display control unit 311 generates an adjustment value for the display brightness of the image display unit 20. The SP display control unit 311 outputs the adjustment value of the display brightness to the coupling device 10, via the I/F unit 341.

Further, via the I/F unit 341, the SP display control unit 311 transmits, to the coupling device 10, a magnet detection value request command requesting the DP control unit 120 to transmit the detection value of the DP magnetic sensor 237 provided in the image display unit 20. When the DP control unit 120 transmits the detection value of the DP magnetic sensor 237 in response to the magnetic detection value request command, the SP display control unit 311 acquires the transmitted detection value.

The SP display control unit 311 determines the presence or absence of the shade 50 on the basis of the detection value of the DP magnetic sensor 237. When the SP display control unit 311 determines that the shade 50 is mounted, the SP display control unit 311 performs operations described below with reference to FIG. 7, and performs processing based on the detection value of the SP illuminance sensor 353 and/or the captured image data acquired by the SP image control unit 312. In this processing, the SP display control unit 311 performs posture determination processing of the smartphone 300 on the basis of the detection values of the SP six-axis sensor 351 and the SP magnetic sensor 352, and performs proximity determination processing on the basis of the detection value of the SP proximity sensor 356.

Figure 6:
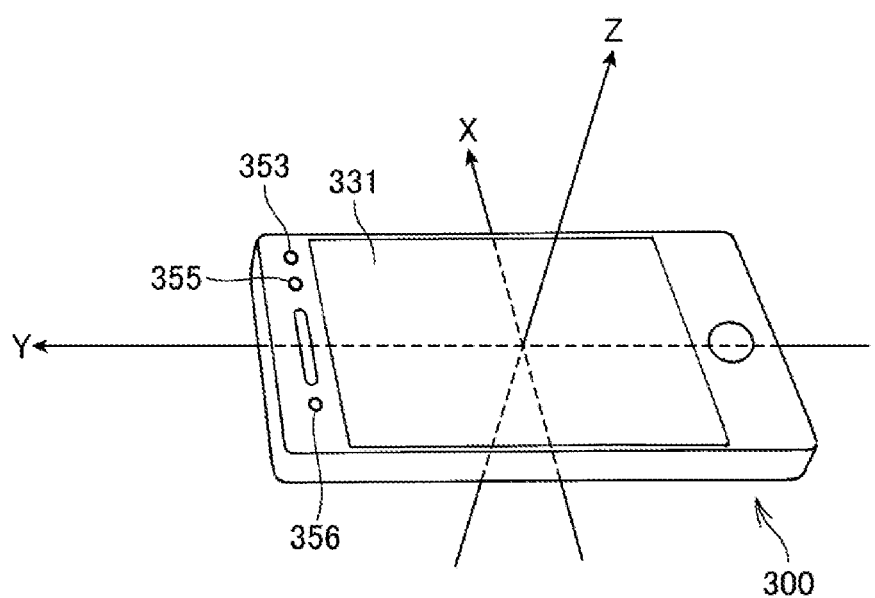
FIG. 6 is an explanatory diagram illustrating detection directions of sensors of a smartphone.

FIG. 6 is an explanatory diagram illustrating detection directions of the sensors of the smartphone 300.

The display panel 331 is provided on the front surface of a main body of the smartphone 300, and the smartphone 300 is provided with the SP illuminance sensor 353, the SP camera 355, and the SP proximity sensor 356 on the same face as the display panel 331. The SP six-axis sensor 351 detects the movement of the smartphone 300 based on reference axial directions, namely, a Z-axis direction that is a direction perpendicular to the display panel 331, a Y-axis direction that is parallel to the lengthwise direction of the display panel 331 and perpendicular to the Z-axis, and an X-axis direction that is perpendicular to the Z-axis and the Y-axis. Further, the SP magnetic sensor 352 detects relative relationships between the X-axis, the Y-axis, and the Z-axis of the smartphone 300 and a geomagnetic direction.

In the example illustrated in FIG. 6, the SP illuminance sensor 353 is disposed to be oriented in the Z-axis direction. Therefore, the SP illuminance sensor 353 detects the illuminance of environmental light from the direction in which the display panel 331 is facing. The SP camera 355 captures the angle of view including the direction in which the display panel 331 is facing. Further, the SP proximity sensor 356 detects the approach of the object to be detected in the direction in which the display panel 331 is facing.

Returning to FIG. 5, the SP image capture control unit 312 controls the SP camera 355 to cause the SP camera 355 to perform the image capture, and acquires the captured image data of the SP camera 355.

Further, the SP image capture control unit 312 generates an image capture command instructing the DP control unit 120 to capture an image using the DP camera 61, and outputs the image capture command to the coupling device 10 via the I/F unit 341. When the DP control unit 120 performs the mage capture using the DP camera 61 in accordance with the image capture command and transmits the captured image data, the SP image capture control unit 312 acquires the transmitted captured image data.

The SP image processing unit 313 performs processing on the captured image data acquired by the SP image capture control unit 312. For example, the SP image processing unit 313 extracts some pixels configuring the captured image data, determines the brightness from pixel values of the extracted pixels, and calculates the brightness value for the entire captured image data.

1-5. Configuration of DP Control Unit of HMD

As illustrated in FIG. 5, the DP control unit 120 of the HMD 100 is provided with a DP detection control unit 121, a DP display control unit 123, and a DP image capture control unit 125. Specifically, the DP control unit 120 functions as the DP detection control unit 121, the DP display control unit 123, and the DP image capture control unit 125 by the processor provided in the DP control unit 120 executing the control program.

The DP control unit 120 receives and acquires commands and data transmitted by the smartphone 300 via the I/F unit 110.

When the DP detection control unit 121 acquires an illuminance request command transmitted by the smartphone 300, the DP detection control unit 121 acquires the detection value of the DP illuminance sensor 65 in accordance with the illuminance request command, and transmits the acquired detection value to the smartphone 300 via the I/F unit 110.

When the DP detection control unit 121 acquires a magnet detection value request command transmitted by the smartphone 300, the DP detection control unit 121 acquires the detection value of the DP magnetic sensor 237 in accordance with the magnet detection value request command, and transmits the acquired detection value to the smartphone 300 via the I/F unit 110.

Here, the DP detection control unit 121 acquires the detection values at sampling periods preset for the DP illuminance sensor 65 and the DP magnetic sensor 237. The DP detection control unit 121 transmits each of the detection values to the smartphone 300 at the timing at which the detection value is acquired or at a timing specified by a command transmitted by the smartphone 300.

The DP display control unit 123 controls the image display unit 20 on the basis of video data or image data transmitted by the smartphone 300, and causes video or images to be displayed by the right display unit 22 and the left display unit 24.

The DP display control unit 123 performs brightness adjustment of the right display unit 22 and the left display unit 24. The DP display control unit 123 adjusts the display brightness of the right display unit 22 and the left display unit 24 in accordance with an adjustment value of the display brightness transmitted by the smartphone 300.

When the DP image capture control unit 125 acquires an image capture command transmitted by the smartphone 300, the DP image capture control unit 125 performs image capture using the DP camera 61 in accordance with the image capture command, acquires captured image data, and transmits the acquired captured image data to the smartphone 300.

1-6. Operations of SP Control Unit

Figure 7:
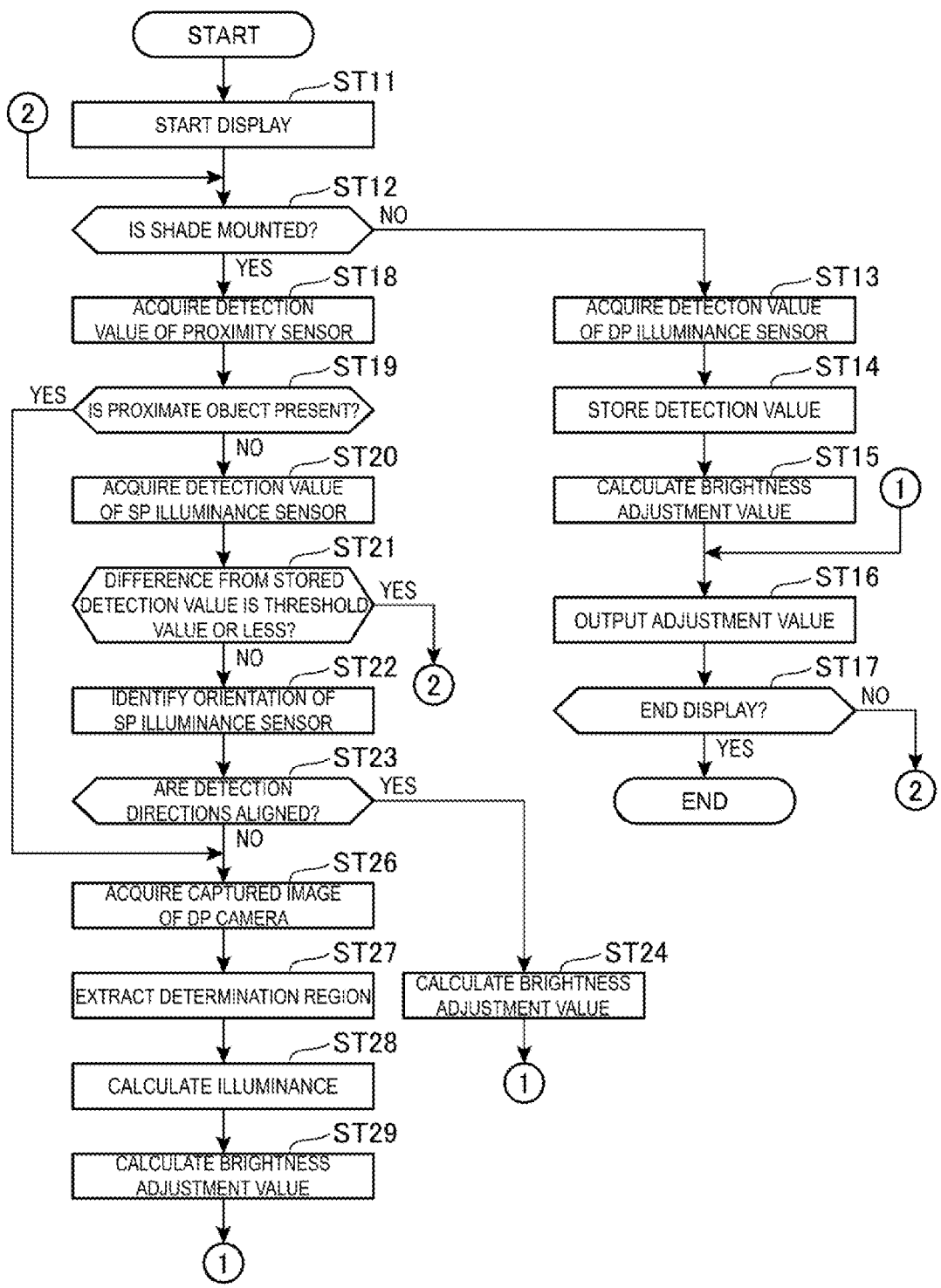
FIG. 7 is a flowchart illustrating operations of an SP control unit according to a first embodiment.

FIG. 7 is a flowchart illustrating operations of the SP control unit 310 according to the first embodiment.

In the operations illustrated in FIG. 7, step ST26 corresponds to an operation of the SP image capture control unit 312, steps ST27 and ST28 correspond to operations of the SP image processing unit 313, and operations of each of other steps correspond to operations of the SP display control unit 311.

The SP control unit 310 outputs the video data to the HMD 100 and causes the image display unit 20 to start display (step ST11).

The SP control unit 310 determines whether or not the shade 50 is mounted (step ST12), on the basis of the detection value of the DP magnetic sensor 237 or on a change in the detection value. At step ST12, for example, it is determined that the shade 50 is mounted when the detection value of the DP magnetic sensor 237 has drifted. Further, it may be determined at step ST12 that the shade 50 is mounted when an input is made by the user U that the shade 50 has been mounted, by an operation of the operation unit 140.

When it is determined that the shade 50 is not mounted (NO at step ST12), the SP control unit 310 acquires the detection value of the DP illuminance sensor 65 (step ST13). The SP control unit 310 stores the detection value of the DP illuminance sensor 65 in the non-volatile storage unit 320 or in the memory of the SP control unit 310 (step ST14). If the detection value of the DP illuminance sensor 65 is already stored, then the stored detection value is updated at step ST14.

On the basis of the detection value of the DP illuminance sensor 65, the SP control unit 310 generates the adjustment value for adjusting the display brightness of the image display unit 20, and outputs the adjustment value from the I/F unit 341 (step ST16). The HMD 100 adjusts the display brightness of the right display unit 22 and the left display unit 24 in accordance with the adjustment value output by the smartphone 300 at step ST16.

The SP control unit 310 determines whether or not to end the display by the HMD 100 (step ST17), and when the display is to be ended (YES at step ST17), the SP control unit 310 ends various controls relating to the HMD 100. When the display is not to be ended (NO at step ST17), the operation returns to step ST12.

On the other hand, when it is determined that the shade 50 is mounted (YES at step ST12), the SP control unit 310 acquires the detection value of the SP proximity sensor 356 (step ST18), and determines the presence or absence of a proximate object approaching the smartphone 300 (step ST19).

The SP proximity sensor 356 is disposed alongside the SP illuminance sensor 353, as illustrated in FIG. 6, and is oriented in the same direction as the SP illuminance sensor 353. Specifically, the SP proximity sensor 356 detects the proximate object in an incident direction of the outside light detected by the SP illuminance sensor 353. In other words, the SP proximity sensor detects the proximate object that obstructs the outside light detected by the SP illuminance sensor 353. Thus, when there is the proximate object detected by the SP proximity sensor 356, the SP illuminance sensor 353 can be said to not be in an appropriate state for detecting the amount of outside light, that is, the amount of environmental light.

When there is the proximate object detected by the SP proximity sensor 356 (YES at step ST19), the operation of the SP control unit 310 advances to step ST26 described below.

When there is no proximate object detected by the SP proximity sensor 356 (NO at step ST19), that is, when the proximate object is not detected, the SP control unit 310 acquires the detection value of the SP illuminance sensor 353 (step ST20). The SP control unit 310 compares the detection value of the DP illuminance sensor 65 stored at step ST14 with the detection value of the SP proximity sensor 356 acquired at step ST20, and determines whether a difference therebetween is equal to or less than a threshold value (step ST21). Here, the threshold value is preset and stored, for example, in the non-volatile storage unit 320.

Detection characteristics of the DP illuminance sensor 65 can be said to be generally close to those of the SP illuminance sensor 353 that is used in the typical smartphone 300. Alternatively, as long as the DP illuminance sensor 65 and the SP illuminance sensor 353 output the detection values in formats that can be compared, the detection characteristics may be different.

When the difference between the detection values is equal to or less than the threshold value (YES at step ST21), there is no need to adjust the display brightness, and the SP control unit 310 returns the operation to step ST12.

When the difference between the detection values exceeds the threshold value (NO at step ST21), the SP control unit 310 identifies the orientation of the SP illuminance sensor 353 (step ST22). At step ST22, on the basis of the detection value of the SP six-axis sensor 351 and/or the detection value of the SP magnetic sensor 352, the SP control unit 310 identifies the direction of the Z-axis of the smartphone 300, and identifies the direction of the outside light detected by the SP illuminance sensor 353. The SP control unit 310 determines whether or not the detection direction of the SP illuminance sensor 353 is aligned with the orientation of the HMD 100 (step ST23).

Figure 8:
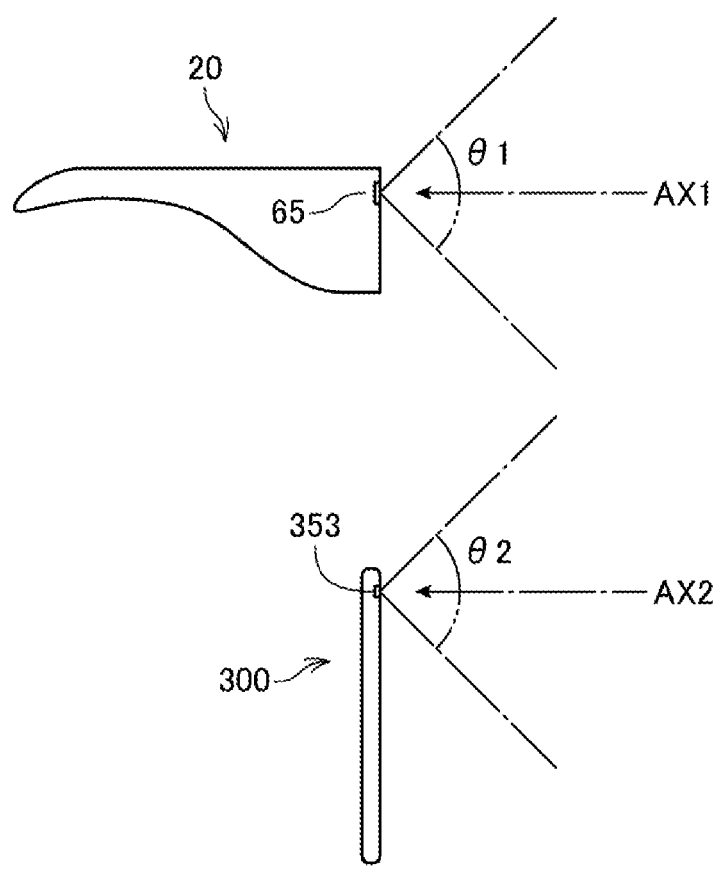
FIG. 8 is an explanatory diagram of detection directions of illuminance sensors.

FIG. 8 is an explanatory diagram of the detection directions of the illuminance sensors, and schematically illustrates the orientation of the DP illuminance sensor 65 and the orientation of the SP illuminance sensor 353.

In FIG. 8, the direction of the outside light, that is, the environmental light, detected by the DP illuminance sensor 65 is indicated by a detection direction AX1. The light received by the DP illuminance sensor 65 is incident on the DP illuminance sensor 65 from a range of an angle $\theta 1$ centered on the detection direction AX1.

Also, in FIG. 8, the direction of the outside light, that is, the environmental light, detected by the SP illuminance sensor 353 is indicated by a detection direction AX2. The light received by the SP illuminance sensor 353 is incident on the SP illuminance sensor 353 from a range of an angle θ2 centered on the detection direction AX2.

The SP control unit 310 identifies the detection direction AX1 from the detection value of the DP six-axis sensor 235 and/or the detection value of the DP magnetic sensor 237. Further, the SP control unit 310 identifies the detection direction AX2 from the detection value of the SP six-axis sensor 351 and/or the detection value of the SP magnetic sensor 352.

As illustrated in FIG. 1, the DP illuminance sensor 65 is disposed on the front face of the image display unit 20, and the DP illuminance sensor 65 receives and detects the outside light incident from the range of the angle θ1 centered on the detection direction AX1. The angle θ1 is from 50° (radian) to 100°, for example. Further, the SP illuminance sensor 353 is positioned on the surface on which the display panel 331 is disposed in the smartphone 300, and receives and detects the outside light incident from the range of the angle θ2 centered on the detection direction AX2. In a similar manner to the angle θ1, the angle θ2 is from 50° to 100°, for example. The angles 91 and 92 are determined by specifications of the DP illuminance sensor 65 and the SP illuminance sensor 353, and are not limited to the range described above. The angle θ1 and the angle θ2 may be different values. For example, the DP illuminance sensor 65 or the SP illuminance sensor 353 may be used with which the angle θ1 and/or the angle θ2 is 30° or less.

On the basis of the detection value of the DP geomagnetic sensor 237, the SP control unit 310 determines an angle of the image display unit 20 using geomagnetism as a reference, and identifies the detection direction AX1 that extends substantially perpendicularly from the front face of the image display unit 20. Here, since the magnetism of the magnet 52 imparts an effect on the DP magnetic sensor 237 as a result of the shade 50 being mounted, the SP control unit 310 may perform processing that corrects or calibrates the drift of the detection value of the DP magnetic sensor 237 due to the effect of the magnet 52. Similarly, on the basis of the detection value of the SP magnetic sensor 352, the SP control unit 310 identifies the Z-axis using geomagnetism as a reference, and identifies the detection direction AX2.

When an angle formed between the detection direction AX1 and the detection direction AX2 is within a preset range, this is considered to be equivalent to a case in which the SP illuminance sensor 353 is oriented in a direction corresponding to the outside light transmitted through the image display unit 20. In other words, the SP illuminance sensor 353 being oriented in the direction corresponding to the outside light transmitted through the image display unit 20 means that the difference between the detection direction of the DP illuminance sensor 65 and the detection direction of the SP illuminance sensor 353 is within the set range. Here, the set range may be, for example, 30° or less. Further, for example, the range may be set on the basis of magnitudes of the angles θ1 and θ2, and specifically, may be a range that is set to be half of the smaller angle, of the angle θ1 and the angle θ2.

Further, the SP control unit 310 may set the range of the angle formed between the detection direction AX1 and the detection direction AX2 on the basis of the detection value of the DP illuminance sensor 65 and/or the detection value of the SP illuminance sensor 353. That is, a change in the detection value of the DP illuminance sensor 65 during a change in the detection direction AX1 is determined from a history of the detection values of the DP magnetic sensor 237 and a history of the detection values of the DP illuminance sensor 65, and it is determined whether or not the brightness in an installation environment of the image display unit 20 is relatively uniform. When the brightness in the installation environment of the image display unit 20 is relatively uniform, this means that the outside light received by the DP illuminance sensor 65 is light from a light source in a specific direction. Further, when the brightness in the installation environment of the image display unit 20 is relatively uniform, the light detected by the DP illuminance sensor 65 is the environmental light in the installation environment of the image display unit 20. When the DP illuminance sensor 65 is detecting the environmental light, the range set for the difference between the detection direction AX1 and the detection direction AX2 can be set to be larger. Further, when the DP illuminance sensor 65 is detecting the light from the light source in the specific direction, the range set for the difference between the detection direction AX1 and the detection direction AX2 is preferably set to be smaller. In this way, the SP control unit 310 may determine whether the light received by the DP illuminance sensor 65 is the light from the light source in the specific direction or is the environmental light in the installation environment of the display unit 20, and may switch a reference value, namely, the set range, on the basis of a determination result. This reference value may be used to determine whether the SP illuminance sensor 353 is oriented in the direction corresponding to the outside light transmitted through the image display unit 20.

At step ST23, the SP control unit 310 determines whether or not the orientation of the SP illuminance sensor 353 is the direction corresponding to the detection direction AX1 of the DP illuminance sensor 65, using the method described above, for example. In other words, when the difference between the detection direction AX1 and the detection direction AX2 is within the set range, it is determined that the detection directions are aligned, and when the difference between the detection direction AX1 and the detection direction AX2 exceeds the set range, it is determined that the detection directions are not aligned.

At step ST22 to step ST23, the SP control unit 310 may compare the detection values of the SP six-axis sensor 235 and the SP six-axis sensor 351, or may compare the detection values of the DP magnetic sensor 237 and the SP magnetic sensor 352. Specifically, a relative angle between the detection direction AX1 and the detection direction AX2 may be directly determined without calculating the detection direction AX1 and the detection direction AX2. In this case, processing to determine the detection directions AX1 and AX2 with respect to the orientation and the gravitational direction is unnecessary.

When it is determined that the detection directions are aligned (YES at step ST23), the SP control unit 310 calculates the adjustment value for the display brightness on the basis of the detection value of the SP illuminance sensor 353 (step ST24) and moves the operation to step ST16. At step ST24, the SP control unit 310 may use the detection value acquired at step ST20, or may acquire a new detection value of the SP illuminance sensor 353. The detection value of the SP illuminance sensor 353 corresponds to an example of second illuminance information of the present disclosure.

When it is determined that the detection directions are not aligned (NO at step ST23), the SP control unit 310 acquires the image captured by the DP camera 61 (step ST26). The SP control unit 310 extracts a region used to determine the illuminance of the environmental light from the image captured by the DP camera 61 (step ST27), and calculates the illuminance from pixel values of the extracted region (step ST28). The illuminance calculated at step ST28 corresponds to an example of third illuminance information [of the present disclosure].

Figure 9:
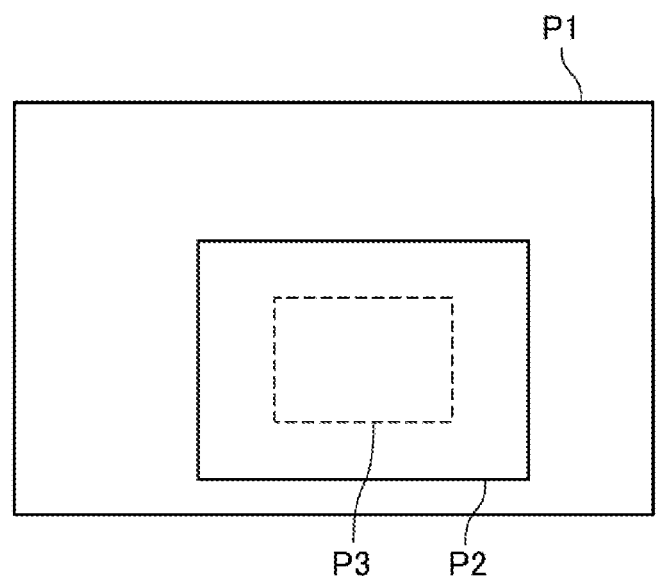
FIG. 9 is an explanatory diagram of processing with respect to a captured image.

FIG. 9 is an explanatory diagram of processing with respect to the image captured at step ST28, and schematically illustrates processing of the DP camera 61 with respect to a captured image P1.

The captured image P1 is an image acquired by the SP control unit 310 via the coupling device 10, and is configured by a number of pixels corresponding to the image resolution of the DP camera 61. When the illuminance is determined, a high-resolution image is not necessary, and the SP control unit 310 extracts a viewing region P2 from the captured image P1. The viewing region P2 is a region, of the angle of view of the DP camera 61, that overlaps with a range of light transmitted through the image display unit 20 and can be visually recognized by the user U. A visible range of the user U in the angle of view of the DP camera 61 can be approximated from the structure of the image display unit 20 and a standard human body size. This approximate value is stored in advance in the non-volatile storage unit 320, for example.

When a number of the pixels in the viewing region P2 is greater than a number of the pixels required for calculating the illuminance, the SP control unit 310 may further extract a processing region P3. The processing region P3 is a region including the center of the viewing region P2 and containing the required number of pixels. The required number may be a VGA resolution equivalent to 680 pixels×480 pixels, for example. By setting the number of pixels in the processing region P3 to be less than that of the captured image P1, a processing load for determining the illuminance is reduced, and an amount of power consumed can be reduced.

The SP control unit 310 acquires, for example, a pixel value of each of the pixels configuring the processing region P3, such as an RGB gray scale value. The SP control unit 310 calculates a value of the illuminance of each of the pixels from the acquired pixel value. Subsequently, the SP control unit 310 calculates an average value of the illuminance of all the pixels in the processing region P3, or calculates an average value of the illuminance of representative pixels selected from the processing region P3, and determines this to be the illuminance of the image P1. In other words, the SP control unit 310 determines the average value of the illuminance in the processing region P3 as the illuminance of the captured image P1.

Further, the SP control unit 310 may identify a pixel having a maximum illuminance, and a pixel having a minimum illuminance in the processing region P3, may determine the average value of the illuminance of these pixels, and may determine this average value to be the illuminance of the captured image P1. In this case, the processing load for determining the average value can be reduced. Even with this type of processing, the illuminance can be determined with a sufficiently high degree of accuracy.

The above-described processing is not limited to the processing region P3, and may be performed with respect to the viewing region P2, or may be performed with respect to the entire captured image P1. Further, representative pixels set in advance may be selected from the captured image P1 or the viewing region P2, and the processing described above may be performed with respect to the representative pixels.

From the illuminance determined by the processing at step ST28, the SP control unit 310 calculates the adjustment value for the display brightness of the image display unit 20 (step ST29), and moves the operation to step ST16.

In the operations illustrated in FIG. 7, when it is not appropriate to calculate the adjustment value for the display brightness from the detection value of the DP illuminance sensor 65 due to the fact that the shade 50 is mounted, the adjustment value for the display brightness can be calculated using the detection value of the SP illuminance sensor 353 and the captured image of the DP camera 61. Thus, even when the DP illuminance sensor 65 is hidden by the shade 50, the display brightness of the image display unit 20 can be appropriately adjusted.

Further, at step ST18 to step ST23, the SP illuminance sensor 353 is used to calculate the adjustment value for the display brightness. Generally, the amount of power consumed by the illuminance sensor is lower than that consumed by the camera. Thus, using the SP illuminance sensor 353 in priority to the DP camera 61 has the advantage that the amount of power consumed by the smartphone 300 and the HMD 100 can be reduced.

Further, at step ST19 and step ST23, the smartphone 300 can accurately determine a condition in which it is not appropriate to use the detection value of the SP illuminance sensor 353, such as the smartphone 300 being stored in a pocket of clothing or in a bag of the user U. Therefore, the display brightness can be adjusted with appropriate accuracy using the SP illuminance sensor 353. In this case, the appropriate display brightness adjustment can be performed using the image captured by the DP camera 61.

Note that, at step ST15, step ST24, and step ST29, the adjustment value for the display brightness corresponds to the fact that the shade 50 is mounted on the image display unit 20, and the outside light is blocked or reduced by the shade 50.

2. Second Embodiment

In a second embodiment, a configuration is assumed in which the HMD 100 is not provided with the DP camera 61 or a configuration in which the DP camera 61 is not used to adjust the display brightness.

Figure 10:
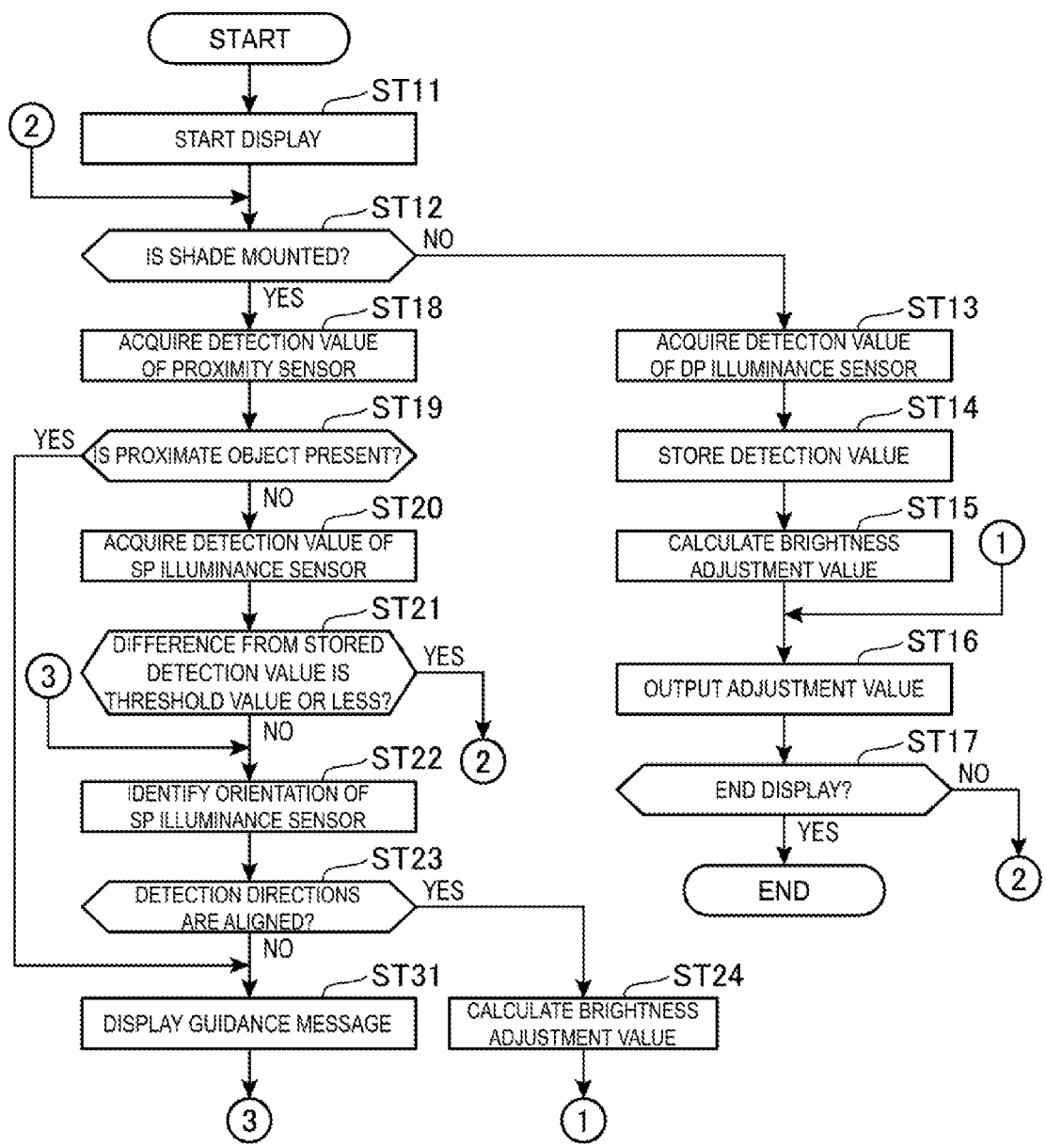
FIG. 10 is a flowchart illustrating operations of the SP control unit according to a second embodiment.

FIG. 10 is a flowchart illustrating operations of the SP control unit 310 according to the second embodiment. In FIG. 10, the same reference signs are assigned to processing that is common to the operations illustrated in FIG. 7, and a description thereof will be omitted.

In the second embodiment, since the DP camera 61 is not used to adjust the display brightness, the SP illuminance sensor 353 is preferably used when the shade 50 is mounted.

Thus, when the SP control unit 310 determines that the detection direction AX2 of the SP illuminance sensor 353 is not aligned with the detection direction AX1 of the DP illuminance sensor 65 (NO at step ST23), the SP control unit 310 performs guidance for the user U (step ST31).

The guidance for the user U is a message or an image that prompts the user U to orient the smartphone 300 in an appropriate direction. The SP control unit 310 displays the message or the image using the image display unit 20, in order to perform the guidance for the user U. For example, a message may be displayed with the characters "Please direct the smartphone to face in front of you". Further, an image may be displayed that schematically portrays the direction in which the smartphone is to be oriented and the figure of the user U.

After performing the guidance for the user U, the SP control unit 310 returns the operation to step ST22 and identifies the detection direction of the SP illuminance sensor 353.

In the second embodiment, by causing the user U to orient the detection direction of the SP illuminance sensor 353 in the appropriate direction, the SP illuminance sensor 353 can be used instead of the DP illuminance sensor 65. Thus, even without using the DP camera 61, the display brightness can be adjusted when the shade 50 is mounted.

3. Effects of Embodiments

As described above, the display system 1 according to each of the above-described embodiments to which the present disclosure is applied is provided with the HMD 100 and the smartphone 300. The HMD 100 is provided with the image display unit 20 that transmits the outside light and displays the image, and the DP illuminance sensor 65 that detects the illuminance of the outside light. The smartphone 300 is provided with the SP display control unit 311 that adjusts the brightness of the image displayed by the image display unit 20 on the basis of the detection value of the DP illuminance sensor 65, and with the SP illuminance sensor 353 that detects the illuminance. The SP display control unit 311 can adjust the brightness of the display image of the image display unit 20 on the basis of the detection value of the SP illuminance sensor 353.

As a result, instead of adjusting the brightness of the display image of the image display unit 20 on the basis of the detection value of the DP illuminance sensor 65, the brightness of the display image of the image display unit 20 can be adjusted on the basis of the detection value of the SP illuminance sensor 353 included in the smartphone 300. Thus, even when the environmental light received by the DP illuminance sensor 65 is blocked or reduced, the display brightness of the image display unit 20 can be appropriately adjusted in accordance with the illuminance of the environmental light or the outside light around the image display unit 20. For example, even when the shade 50 for reducing or blocking the outside light is mounted on the image display unit 20, the display brightness of the image display unit 20 can be adjusted.

In each of the embodiments described above, when the SP illuminance sensor 353 is oriented in the direction corresponding to the outside light transmitted through the image display unit 20, the SP display control unit 311 adjusts the brightness of the image on the basis of the detection value of the SP illuminance sensor 353. Therefore, using the detection value of the SP illuminance sensor 353, the display brightness of the image display unit 20 can be appropriately adjusted, and the visibility of the display image of the image display unit 20 can be favorably maintained.

In each of the above-described embodiments, the smartphone 300 is provided with the SP six-axis sensor 351 and the SP magnetic sensor 352 as the motion sensors for detecting the movement of the smartphone 300. When the direction of the SP illuminance sensor 353 identified by these motion sensors is oriented in the direction corresponding to the outside light transmitted through the image display unit 20, the SP display control unit 311 adjusts the brightness of the image on the basis of the detection value of the SP illuminance sensor 353. Thus, when the detection value of the SP illuminance sensor 353 favorably reflects the detection value of the DP illuminance sensor 65, the brightness of the display image of the image display unit 20 is adjusted using the detection value of the SP illuminance sensor 353. Thus, the brightness of the display image of the image display unit 20 can be appropriately adjusted in accordance with the illuminance of the environmental light or the outside light around the image display unit 20.

In the first embodiment, the HMD 100 is provided with the DP camera 61. The smartphone 300 is provided with the SP image processing unit 313 that generates the information relating to the illuminance of the outside light incident on the DP camera 61, on the basis of the image captured by the DP camera 61. The SP display control unit 311 can adjust the brightness of the image on the basis of the illuminance obtained from the captured image. Thus, instead of the DP illuminance sensor 65, the image captured by the DP camera 61 can be used to appropriately adjust the brightness of the display image of the image display unit 20.

In the first embodiment, the camera 61 captures the range that overlaps with the outside scenery that passes through the image display unit 20 and is visually recognized. Therefore, the brightness of the display image of the image display unit 20 can be adjusted in accordance with the illuminance of the outside light from a direction that particularly affects the visibility of the display image, without using the DP illuminance sensor 65.

In the first embodiment, the SP image processing unit 313 generates the third illuminance information on the basis of brightness information of a predetermined number of the pixels configuring the captured image. As a result, the processing load relating to the captured image can be suppressed, and the amount of power consumed can be suppressed.

In each of the above-described embodiments, the shade 50 that adjusts the outside light incident on the image display unit 20 can be detachably mounted on the HMD 100. The SP display control unit 311 adjusts the brightness of the image on the basis of the second illuminance information when the shade 50 is mounted on the HMD 100. Thus, the outside light that passes through the image display unit 20 can be blocked or reduced by the shade 50, and in this case, the brightness of the display image of the image display unit 20 can be appropriately adjusted in accordance with the mounting of the shade 50.

Further, a display control method for the display system 1 detects the illuminance of the outside light using the DP illuminance sensor 65 of the HMD 100, and adjusts the brightness of the image displayed by the image display unit 200 on the basis of the detection value of the DP illuminance sensor 65. When the shade 50 that adjusts the outside light incident on the image display unit 20 is mounted on the HMD 100, the display control method detects the illuminance using the SP illuminance sensor 353 of the smartphone 300, and adjusts the brightness of the image on the basis of the detection value of the SP illuminance sensor 353. Thus, even when the shade 50 is mounted on the image display unit 20 and the light detected by the DP illuminance sensor 65 is affected by the shade 50, the brightness of the display image of the image display unit 20 can be appropriately adjusted.

Further, a program that can be executed by a computer configuring the SP control unit 310 of the smartphone 300 causes the DP illuminance sensor 65 of the HMD 100 to detect the illuminance of the outside light. The brightness of the image displayed by the image display unit 20 is adjusted on the basis of the detection value of the DP illuminance sensor 65. When the shade 50 that adjusts the outside light incident on the image display unit 20 is mounted on the HMD 100, the program detects the illuminance using the SP illuminance sensor 353, and adjusts the brightness of the image on the basis of the detection value of the SP illuminance sensor 353. Thus, even when the shade 50 is mounted on the image display unit 20 and the light detected by the DP illuminance sensor 65 is affected by the shade 50, the brightness of the display image of the image display unit 20 can be appropriately adjusted.

4. Other Embodiments

The present disclosure is not limited to the configurations of the embodiments described above, and can be implemented in various modes without departing from the spirit and scope of the disclosure.

For example, in the above-described embodiments, the configuration using the smartphone 300 as the control device is described, but the present disclosure is not limited to this configuration. For example, the control device may be a PDA terminal or may be a tablet personal computer.

Further, in the above-described embodiments, a configuration example in which the HMD 100 displays the video or the images under the control of the smartphone 300 is described, but the present disclosure is not limited to this configuration.

For example, the HMD 100 may include a function of the SP control unit 310 of the smartphone 300, and the HMD 100 may be capable, as a single unit, of replaying and displaying the video and the image content. In this case, a control unit of the HMD 100 may perform communication with an external device different from the HMD 100 and may perform processing such as the display control of the image display unit 20 illustrated in FIG. 7 and FIG. 10, on the basis of a detection value of an external illuminance sensor provided in the external device, and on the basis of a direction of the external illuminance sensor. For example, the HMD 100 may perform wireless communication, through Bluetooth (registered trademark) or the like, or wired communication with a wearable device or the like as the external device, and may perform the processing illustrated in FIG. 7 and FIG. 10 on the basis of the detection value of an illuminance sensor provided in the wearable device. In this case, a geomagnetic sensor or a motion sensor provided in the wearable device may be used. The wearable device includes, for example, a wrist watch-like device, such as a smart watch, and other devices worn on the body or clothing of the user U. In this example, the wearable device configures the display system 1 along with the HMD 100, and the illuminance sensor provided in the wearable device corresponds to an example of the second illuminance detection unit.

Further, as described above, in the configuration in which the HMD 100 includes the function of the SP control unit 310 of the smartphone 300, the function of the SP control unit 310 may be mounted in a device connected to the image display unit 20, such as the coupling device 10. In other words, the HMD 100 may be configured to cause the image display unit 20 to display the video or the image content using a function of a control unit mounted in the coupling device 10. In such a configuration, the control unit mounted in the coupling device 10 may perform the processing illustrated in FIG. 7 and FIG. 10 by connecting to the external device, such as the wearable device, and by using the illuminance sensor, the geomagnetic sensor, and the motion sensor included in the external device. In this example, the wearable device configures the display system 1 along with the HMD 100, and the illuminance sensor provided in the wearable device corresponds to an example of the second illuminance detection unit.

Further, the shade 50 may be an electronic shade that can adjust light transmittance. The electronic shade may be configured, for example, to include terminals (not illustrated) to which a voltage is input, and to change the light transmittance in accordance with the voltage between the terminals. In this case, by adjusting the applied voltage by controlling the DP control unit 120, as described below, the light transmittance of the electronic shade can be adjusted. In the display system 1, a plurality of types of the shade 50 having different light transmittance and/or transmittance wavelength characteristics may be detachably mounted on the image display unit 20. In this case, the type of the shade 50 mounted on the image display unit 20 is preferably detectable by various sensors provided in the image display unit 20. Further, the user U may input or set the type of shade 50 mounted on the image display unit 20, by an operation of the operation unit 140.

Further, in the above-described embodiments, the configuration is exemplified in which the coupling device 10 is connected in a wired manner to the image display unit 20, but the configuration is not limited thereto, and a configuration may be adopted in which the image display unit 20 is wirelessly connected to the coupling device 10. Further, the functions of the coupling device 10 may be provided in the image display unit 20, or the coupling device 10 may be realized by a plurality of devices. For example, in place of the coupling device 10, a wearable device that can be attached to the body or clothing of the user, or to personal adornments worn by the user may be used. The wearable device in such a case may be, for example, a watch-like device, a ring-like device, a laser pointer, a mouse, an air mouse, a game controller, a pen-like device, or the like.

Further, in the above-described embodiments, the configuration is exemplified in which the image display unit 20 and the control device 10 are provided separately, and are connected via the coupling cable 40. The configuration is not limited thereto, and the coupling device 10 and the image display unit 20 can be configured in an integrated manner and configured to be worn on the head of the user.

Further, instead of the image display unit 20, for example, another type of image display unit such as an image display unit to be worn like a cap, for example, may be employed. Such an image display unit may be provided with a display unit that displays images corresponding to the left eye LE of the user and a display unit that displays images corresponding to the right eye RE of the user. Further, the display device may be configured, for example, as an HMD installed in a vehicle, such as a car or an airplane. Further, the display device may be configured, for example, as an HMD built into body protective equipment, such as a helmet. In this case, a portion used to determine a position of the HMD with respect to the user, and a portion that is positioned with respect to that portion can form a mounting portion.

Further, a configuration is exemplified in which the virtual image is formed by the half mirrors 261 and 281 on a part of the right light-guiding plate 26 and the left light-guiding plate 28, as the optical system configured to guide the imaging light to the eyes of the user. The configuration is not limited thereto, and a configuration may be employed in which an image is displayed either over the entire surface of the right light-guiding plate 26 and the left light-guiding plate 28, or in a display region occupying a significant part of the right light-guiding plate 26 and the left light-guiding plate 28. In this case, processing for contracting the image may be included in an operation to change a display position of the image.

Furthermore, the optical elements are not limited to the right light-guiding plate 26 and the left light-guiding plate 28 including the half mirrors 261 and 281, and any optical components that cause the imaging light to be incident on the eyes of the user, specifically, a diffraction grating, a prism, and a holographic display unit, may be employed.

Further, in each of the above-described embodiments, the configuration is described in which the image display unit 20 generates the imaging light using the OLED units 221 and 241, but the present disclosure is not limited to this configuration. The configuration is exemplified in which the OLED units 221 and 241 include the OLED panel and the OLED drive circuit that drives the OLED panel. Here, the OLED panel is the spontaneous emission type display panel configured by the light-emitting elements that respectively emit light by organic electro-luminescence. As a more specific example, the configuration is described in which the OLED panel includes the plurality of pixels, each including the R element, the G element, and the B element, arranged in the matrix. As a modified example, the right display unit 22 and the left display unit 24 may each be configured as an imaging element including an OLED panel as a light source unit and a modulation element that modulates light output from the light source unit and outputs imaging light including light of a plurality of colors. In this way, a configuration can be employed in which the user is caused to visually recognize the virtual image by each of the right display unit 22 and the left display unit 24 guiding the imaging light modulated by the modulating element to the eyes of the user, using a projection optical system, a light-guiding plate, and the like. In the image display unit of this modified example, the modulating element that modulates the light emitted by the OLED panel may be a transmissive liquid crystal panel, may be a reflective liquid crystal panel instead of the transmissive liquid crystal panel, or may be a digital micromirror device. Alternatively, a configuration may be used in which liquid crystal on silicon (LCOS) technology is applied in place of the LCD panel. Further, a display element provided in the image display unit 20 may be a spontaneous emission display element, as represented by an LED array, a laser array, a quantum dot spontaneous emission element, and the like. Further, the image display unit 20 may be, for example, a laser scanning type display in which a laser light source and a laser scanner are combined.

Further, at least some of the functional blocks illustrated in FIG. 4, FIG. 5 and the like may be realized by hardware, or may be realized by a combination of hardware and software, and the configuration is not limited to the configuration in which independent hardware resources are arranged as illustrated in the drawings.

Further, the control program executed by the SP control unit 310 may be stored in the non-volatile storage unit 320 or in another storage unit in the SP control unit 310. Further, a configuration may be employed in which a control program stored in an external device is acquired and executed via the communication unit 345 or the like.

Further, the configuration formed in the coupling device 10 may be formed in duplicate in the image display unit 20. For example, a configuration may be employed in which a processor similar to the processor of the coupling device 10 may be disposed in the image display unit 20, and the processor provided in the coupling device 10 and the processor provided in the image display unit 20 individually execute separate functions.

Further, units of processing in the flowcharts illustrated in FIG. 7 and FIG. 10 are divided up on the basis of main processing content, in order to facilitate the understanding of the processing of the SP control unit 310 of the smartphone 300. The embodiments are not limited by the method of dividing and naming the units of the processing illustrated in each of the flowcharts. Further, the processing of the SP control unit 310 can be divided into more units of processing in accordance with the processing content, or can be divided such that one of the units of processing includes more processing. An order of the processing in the above-described flowcharts is also not limited to the illustrated examples.

Further, the control method of the smartphone 300 of the present disclosure can be realized by causing the computer provided in the smartphone 300 to execute a control program corresponding to the control method of the smartphone 300. Further, this control program can also be recorded in a recording medium recorded so as to be readable by a computer. The recording medium can be a magnetic recording medium, an optical recording medium, or a semiconductor memory device. Specifically, a portable or stationary type recording medium, such as a flexible disk, a compact disk read only memory (CD-ROM), a digital versatile disk (DVD), a Blu-ray (registered tradename) disk, a magneto-optical disc, a flash memory, a card type recording medium, or the like can be used. Further, the recording medium described above may be a non-volatile storage device, such as a RAM, a ROM, or an HDD, which are internal storage devices provided in an image display device. Further, the control program corresponding to the control method of the smartphone 300 can be stored in a server device or the like, and the control method of the smartphone 300 can be realized by downloading the control program to the smartphone 300 from the server device.

What is claimed is:

1. A display system comprising:
   a display device; and
   a control device, wherein
   the display device includes
   a display unit configured to transmit outside light and display an image, and
   a first illuminance sensor disposed on the display device configured to detect an illuminance of the outside light,
   the control device includes
   a processor configured to adjust, based on first illuminance information indicating a detection result of the first illuminance sensor, a brightness of the image displayed by the display unit, and
   a second illuminance sensor disposed on the control device configured to detect the illuminance, and
   the processor is configured to adjust the brightness of the image, based on second illuminance information indicating a detection result of the second illuminance sensor,
   wherein the processor adjusts, based on the second illuminance information, the brightness of the image when the second illuminance sensor is oriented in a direction corresponding to the outside light transmitting through the display unit such that a difference in angle between a detection direction of the first illuminance sensor and a detection direction of the second illuminance sensor is set within a range of 30 degrees.

2. The display system according to claim 1, wherein
   the control device includes a motion sensor, and
   the processor adjusts, based on the second illuminance information, the brightness of the image when a direction of the second illuminance sensor specified by the motion sensor is oriented in a direction corresponding to the outside light transmitting the display unit.

3. The display system according to claim 1, wherein
the display device includes a camera,
the processor is configured to generate, based on a captured image of the camera, third illuminance information relating to the illuminance of the outside light incident on the camera, and
the processor is configured to adjust the brightness of the image, based on the third illuminance information.

4. The display system according to claim 3, wherein
the camera captures a range overlapping with an outside scene visible through the display unit.

5. The display system according to claim 3, wherein
the processor generates the third illuminance information, based on brightness information of a predetermined number of pixels configuring the captured image.

6. The display system according to claim 1, wherein
a light modulating member configured to adjust the outside light incident on the display unit is detachably mounted on the display device, and
when the light modulating member is mounted on the display device, the processor adjusts the brightness of the image, based on the second illuminance information.

7. A display control method for a display system including: a display device including a display unit that transmits outside light and that displays an image; and a control device, the display control method comprising:
detecting an illuminance of the outside light by a first illuminance sensor disposed on the display device;
adjusting a brightness of the image displayed by the display unit, using the control device, based on first illuminance information indicating a detection result of the first illuminance sensor; and
when a light modulating member adjusting the outside light incident on the display unit is mounted on the display device,
detecting the illuminance by a second illuminance sensor disposed on the control device, and
adjusting the brightness of the image, by the control device, based on second illuminance information indicating a detection result of the second illuminance sensor,
wherein the brightness of the image is adjusted based on the second illuminance information when the second illuminance sensor is oriented in a direction corresponding to the outside light transmitting through the display unit such that a difference in angle between a detection direction of the first illuminance sensor and a detection direction of the second illuminance sensor is set within a range of 30 degrees.

8. A non-transitory computer readable recording medium storing a program executable by a computer coupled to a display device including a display unit that transmits outside light and displays an image, the program causing the computer to execute:
detecting an illuminance of the outside light by a first illuminance sensor disposed on the display device;
adjusting a brightness of the image displayed by the display unit, based on first illuminance information indicating a detection result of the first illuminance sensor; and
when a light modulating member adjusting the outside light incident on the display unit is mounted on the display device,
detecting the illuminance by a second illuminance sensor, and
adjusting the brightness of the image, based on second illuminance information indicating a detection result of the second illuminance sensor coupled to the computer,
wherein the brightness of the image is adjusted based on the second illuminance information when the second illuminance sensor is oriented in a direction corresponding to the outside light transmitting through the display unit such that a difference in angle between a detection direction of the first illuminance sensor and a detection direction of the second illuminance sensor is set within a range of 30 degrees.

* * * * *